(12) United States Patent
Oh et al.

(10) Patent No.: US 10,353,975 B2
(45) Date of Patent: Jul. 16, 2019

(54) TERMINAL, SERVER AND EVENT SUGGESTING METHODS THEREOF

(71) Applicant: SAMSUNG ELECTRONICS CO., LTD., Suwon-si, Gyeonggi-do (KR)

(72) Inventors: Hyung-rai Oh, Seoul (KR); Ho-jin Choi, Seoul (KR); Zae-myung Kim, Daejeon (KR); Kyo-joong Oh, Daejeon (KR); Chae-gyun Lim, Daejeon (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 366 days.

(21) Appl. No.: 15/369,163

(22) Filed: Dec. 5, 2016

(65) Prior Publication Data

US 2017/0161393 A1  Jun. 8, 2017

(30) Foreign Application Priority Data

Dec. 8, 2015 (KR) ........................ 10-2015-0174242

(51) Int. Cl.
*G06F 16/9535* (2019.01)
*G06Q 50/14* (2012.01)
(Continued)

(52) U.S. Cl.
CPC ......... *G06F 16/9535* (2019.01); *G06Q 50/14* (2013.01); *H04L 51/32* (2013.01);
(Continued)

(58) Field of Classification Search
CPC .................................................. G06Q 50/14
See application file for complete search history.

(56) References Cited

U.S. PATENT DOCUMENTS 8,554,873 B1  10/2013 Ganesh
9,754,307 B2 *  9/2017 Veugen .............. G06Q 30/0278
(Continued)

FOREIGN PATENT DOCUMENTS

JP  2010-211556  9/2010
JP  2013-131075  7/2013
(Continued)

OTHER PUBLICATIONS

Gupta et al., "Identifying purchase intent from social posts", Proceedings of the Eighth International AAAI Conference on Weblogs and Social Media, 2014, pp. 180-186.
(Continued)

*Primary Examiner* — William Spieler
(74) *Attorney, Agent, or Firm* — Nixon & Vanderhye P.C.

(57) ABSTRACT

Disclosed are a terminal, a server and event suggesting methods thereof, the event suggesting method using word embedding, the method including: determining user preference information about a predetermined object by assigning values to a plurality of reference items with respect to user input data corresponding to the object; generating user intent information, which includes values based on the plurality of reference items, based on at least one piece of review data corresponding to a plurality of events for recommendation objects, and accessing a database built up by adding the generated user intent information to the plurality of events; and suggesting an event following the object among the plurality of events based on a similarity between the user preference information about the object and the user intent information of each event included in the database. Thus, the event based on to a user's preference is suggested, thereby providing the event-recommendation service to make a user's satisfaction higher.

19 Claims, 25 Drawing Sheets

(51) Int. Cl.
  *H04L 12/58* (2006.01)
  *H04L 29/08* (2006.01)
  *H04W 4/02* (2018.01)
  *H04W 4/21* (2018.01)
  *H04W 4/14* (2009.01)

(52) U.S. Cl.
  CPC ............ *H04L 67/22* (2013.01); *H04L 67/306* (2013.01); *H04W 4/023* (2013.01); *H04W 4/21* (2018.02); *H04L 51/02* (2013.01); *H04L 51/22* (2013.01); *H04L 67/02* (2013.01); *H04L 67/10* (2013.01); *H04W 4/14* (2013.01)

(56) References Cited

U.S. PATENT DOCUMENTS

| | | | |
|---|---|---|---|
| 2009/0150156 A1* | 6/2009 | Kennewick | G06Q 30/0261 704/257 |
| 2011/0145285 A1 | 6/2011 | Gustafson et al. | |
| 2011/0153654 A1 | 6/2011 | Lee | |
| 2012/0166370 A1 | 6/2012 | Hu et al. | |
| 2013/0110927 A1 | 5/2013 | Marra et al. | |
| 2013/0290324 A1 | 10/2013 | Gibergyes et al. | |
| 2014/0129372 A1 | 5/2014 | Kalnsay | |
| 2015/0032768 A1* | 1/2015 | Miller | G06Q 10/02 707/769 |
| 2015/0046220 A1 | 2/2015 | Gerard et al. | |
| 2016/0125502 A1* | 5/2016 | Byron | G06Q 30/0631 705/6 |
| 2017/0046802 A1* | 2/2017 | Zhang | G06F 16/9535 |
| 2017/0048664 A1* | 2/2017 | Zhang | G06F 16/9535 |
| 2018/0039633 A1* | 2/2018 | Miyoshi | G10L 15/1822 |
| 2018/0040020 A1* | 2/2018 | Kurian | G06Q 30/0256 |

FOREIGN PATENT DOCUMENTS

| | | |
|---|---|---|
| KR | 10-2004-0049498 | 6/2004 |
| KR | 10-2010-0006752 | 1/2010 |
| KR | 10-2012-0081436 | 7/2012 |
| KR | 10-2014-0104543 | 8/2014 |

OTHER PUBLICATIONS

Yuan et al., "Human mobility discovering and movement intention detection with GPS trajectories", Decision Support Systems, vol. 63, (2014) pp. 39-51.

* cited by examiner

FIG. 14

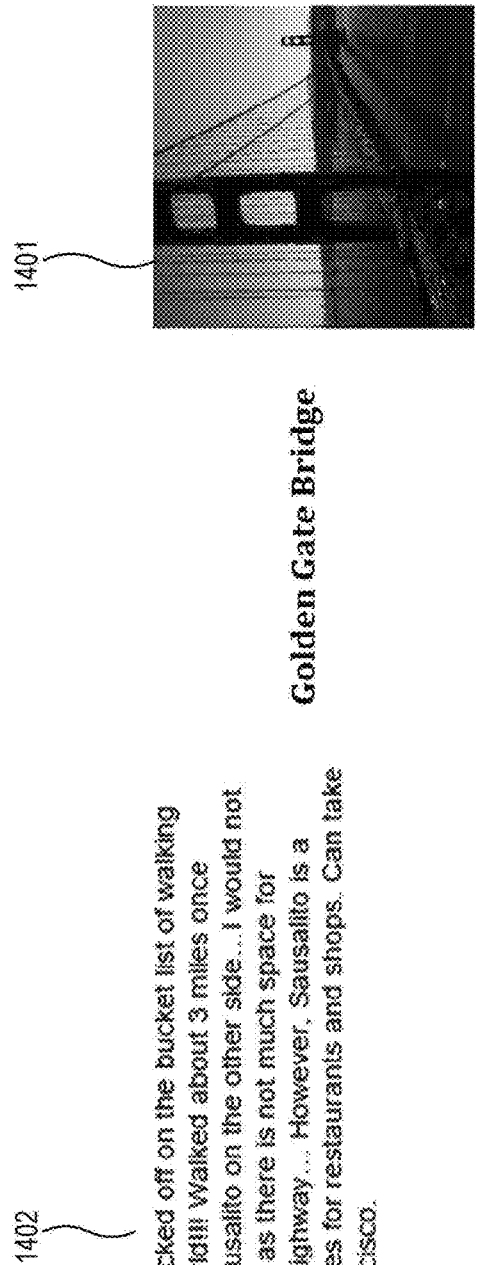

1401

Golden Gate Bridge

1402 — Amazing views of the bay! Checked off on the bucket list of walking famous bridges around the world!!! Walked about 3 miles once crossed the Golden Gate to Sausalito on the other side... I would not recommend to do with children as there is not much space for pedestrians to walk along the highway... However, Sausalito is a quaint town with different choices for restaurants and shops. Can take a bus back across to San Francisco.

Visited December 2014

FIG. 20

User preference vector

| Business | Eating out | Edu/ training | Health | Holiday/ leisure | Religion | Shopping | Socializing |
|---|---|---|---|---|---|---|---|
| 0.05 | 0.10 | 0.10 | 0.30 | 0.10 | 0.00 | 0.15 | 0.20 |

— 2001

Modification
e.g. if { Time: {Apr 13, 2015 12:00:00 PM} } then {setValue("Eating out", MAX_INTENT), ...}

| Business | Eating out | Edu/ training | Health | Holiday/ leisure | Religion | Shopping | Socializing |
|---|---|---|---|---|---|---|---|
| 0.00 | 0.40 | 0.05 | 0.25 | 0.05 | 0.00 | 0.10 | 0.15 |

— 2002

FIG. 21
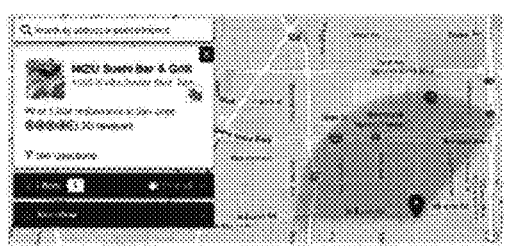 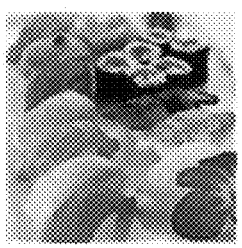
MIZU Sushi Bar & Grill — 2101

TERMINAL, SERVER AND EVENT SUGGESTING METHODS THEREOF

CROSS-REFERENCE TO RELATED APPLICATION

This application is based on and claims priority under 35 U.S.C. § 119 to Korean Patent Application No. 10-2015-0174242, filed on Dec. 8, 2015 in the Korean Intellectual Property Office, the disclosure of which is incorporated by reference herein in its entirety.

BACKGROUND

Field

The present disclosure relates generally to a terminal, a server and event suggesting methods thereof, and for example, to a terminal, a server and event suggesting methods thereof, in which an event is recommended based on a user's intent.

Description of Related Art

With development of Internet, Web 2.0 age has come and the smart phone has widespread. This leads to a paradigm of openness, participation and sharing, and thus various pieces of information are being shared in real time between users through a blog, a social network service (SNS), etc.

For example, a variety of travel information offered by travelers is shared on the World Wide Web, and many people who plan a trip use the shared information. This information includes not only text information about reviews of visited destinations or famous restaurants but also pictures, sounds and moving pictures and the like data.

Accordingly, in light of analyzing this information to catch a traveler's interest and recommending him/her optimized events, destinations, food, etc., there is a growing demand for improving performance of recommendation.

Further, with recent development of text mining and big-data processing techniques, use of an intelligent recommendation system, where such techniques and various pieces of content are combined with each other, has been on the rise.

SUMMARY

According to an aspect of an example embodiment, an event suggesting method using word embedding is provided, the method including: determining user preference information about a predetermined object by assigning values to a plurality of reference items with respect to user input data corresponding to the object; generating user intent information, which includes values based on the plurality of reference items, based on at least one piece of review data corresponding to a plurality of events for recommendation objects, and accessing a database built up by adding the generated user intent information to the plurality of events; and suggesting an event following the object among the plurality of events based on similarity between the user preference information about the object and the user intent information of each event included in the database. Accordingly, a user's satisfaction is improved since the next event is recommended reflecting a user's preference.

The method may further include: sensing a trigger event that the terminal receives the user input data. Thus, an event is recommended corresponding to a user's preference in response to an input of a user's new review.

The user input data may include at least one of a text, a picture, a moving picture and a voice uttered by a user, and is input by at least one of a review to be input to a website, a short message service (SMS), a social network service (SNS) and E-mail. Thus, various types of a user's review are used in recommending an event.

The user input data may include a plurality of user reviews input at a predetermined distance of time and respectively corresponding to the plurality of objects, and the method may further include sensing a trigger event that history information including the plurality of user reviews is updated. Thus, an event is recommended reflecting a user's preference based on a user's travel history.

The method may further include: sensing a user's context information as a trigger event; changing the user preference information by increasing or decreasing the value of at least one among the plurality of reference items in the user preference information in accordance with the sensed context information. Thus, an event that a user needs is suggested in accordance with a user's current state, thereby improving a user's satisfaction and a simple change of information is enough to change a recommended service in accordance with a user's current state.

The object may include a travel destination previously visited by a user, and the event may include a next travel destination recommendable based on a user's intent about the visited travel destination. Thus, the travel-destination recommendation service is provided in accordance with a user's preference.

The method may further include: building up the database by collecting at least one piece of review data with respect to the plurality of events from at least one accessible website. Thus, many universal preferences are used in recommending an event since a database is built based on review data collected from various users.

The building up the database may include: creating a visit intent vector based on a user's visit intent with respect to the collected review data; and adding a travel-destination visit intent vector, which is created by averaging and normalizing the created visit intent vector according to the plurality of events, as the user intent information to the plurality of events. Thus, the database is built using a simple vector type data.

The creating the visit intent vector may include: crawling the collected review data; preprocessing at least one word to be filtered out of the crawled review data; and transforming the preprocessed review data into a review vector by word embedding. Thus, the database is built using an effective word reflecting a user's intent.

The method may further include: creating intent vectors respectively corresponding to the plurality of reference items from a set of words according to intents respectively created with respect to the plurality of events; and computing similarity between the transformed review vector and each of the plural intent vectors corresponding to the plurality of reference items and assigning the similarity to the visit intent vector. Thus, a visit intent vector is created by a simple mathematical operation.

The building up the database may include computing a correlation distance between the plurality of events by the travel-destination visit intent vector; and establishing a travel-destination network model in the database so that the events can be linked to form a network if the correlation distance is not greater than a predetermined reference value. Thus, a database is built with a network model where the travel destinations having high similarity are connected.

According to an aspect of an example embodiment, a terminal is provided, the terminal including: a display; input circuitry configured to receive an input; a communicator comprising communication circuitry configured to access a database built up by adding a user intent information, which is generated based on at least one piece of review data corresponding to a plurality of events for recommendation objects and includes values based on a plurality of reference items, to the plurality of events; at least one processor configured to determine user preference information about a predetermined object by assigning values to the plurality of reference items with respect to user input data corresponding to the object, and to control the display to display information for suggesting an event following the object among the plurality of events based on similarity between the user preference information about the object and the user intent information of each event involved in the database. Accordingly, a user's satisfaction is improved since the next event is recommended reflecting a user's preference.

The processor may sense a trigger event that the terminal receives the user input data. Thus, an event is recommended corresponding to a user's preference in response to an input of a user's new review.

The user input data may include a plurality of user reviews input at a predetermined distance of time and respectively corresponding to the plurality of objects, and the processors may sense a trigger event that history information including the plurality of user reviews is updated. Thus, various types of a user's review are used in recommending an event.

The processor may sense a user's context information as a trigger event, and change the user preference information by increasing or decreasing the value of at least one among the plurality of reference items in the user preference information in accordance with the sensed context information. Thus, an event that a user needs is suggested in accordance with a user's current state, thereby improving a user's satisfaction and a simple change of information is enough to change a recommended service in accordance with a user's current state.

According to an aspect of an example embodiment, a server to be accessed by at least one terminal is provided, the server including: a communicator comprising communication circuitry configured to receive information of user input data about a predetermined object from the terminal; a database configured to be built up by generating user intent information, which includes values according to a plurality of reference items, based on at least one piece of review data corresponding to a plurality of events for recommendation objects, and adding the generated user intent information to the plurality of events; at least one processor configured to determine a recommendation event following the object among the plurality of events based on similarity between user preference information about the object determined by assigning values to the plurality of reference items with respect to the user input data and the user intent information of each event involved in the database, and to control the communication circuitry to send information about the determined recommendation event to the terminal. Accordingly, a user's satisfaction is improved since the next event is recommended reflecting a user's preference.

The object may include a travel destination previously visited by a user, and the event may include a next travel destination recommendable based on a user's intent about the visited travel destination. Thus, the travel-destination recommendation service is provided in accordance with a user's preference.

The processor may build up the database by collecting at least one piece of review data according to the plurality of events from at least one accessible website, creating a visit intent vector based on a user's visit intent with respect to the collected review data, and adding a travel-destination visit intent vector, which is created by averaging and normalizing the created visit intent vector according to the plurality of events, as the user intent information to the plurality of events. Thus, many universal preferences are used in recommending an event since a database is built based on review data collected from various users.

The processor may determine a correlation distance between the plurality of events by the travel-destination visit intent vector, and establish a travel-destination network model in the database so that the events can be linked to form a network if the correlation distance is not greater than a predetermined reference value. Thus, a database is built with a network model where the travel destinations having high similarity are connected.

According to an aspect of an example embodiment, a computer-readable medium is provided, in which a program for implementing a method of suggesting an event is recorded, the method including: determining user preference information about a predetermined object by assigning values to a plurality of reference items with respect to user input data corresponding to the object; generating user intent information, which comprises values according to the plurality of reference items, based on at least one piece of review data corresponding to a plurality of events for recommendation objects, and accessing a database built up by adding the generated user intent information to the plurality of events; and suggesting an event following the object among the plurality of events based on similarity between the user preference information about the object and the user intent information of each event involved in the database. Accordingly, a user's satisfaction is improved since the next event is recommended reflecting a user's preference.

BRIEF DESCRIPTION OF THE DRAWINGS

The above and/or other aspects and attendant advantages will become more readily apparent and appreciated from the following detailed description, taken in conjunction with the accompanying drawings, in which like reference numerals refer to like elements, and wherein:

FIG. 14 to FIG. 16 are diagrams illustrating an example of suggesting the next destination based on a user's review;

FIG. 20 to FIG. 24 are diagrams illustrating an example of suggesting the next destination based on a user's context awareness.

DETAILED DESCRIPTION

Below, example embodiments will be described with reference to accompanying drawings to such an extent as to be easily understood by a person having an ordinary knowledge in the art. The present disclosure is not limited to the example embodiments set forth herein, and may be materialized variously.

For clarity, elements not directly related to the elements of the example embodiment may be omitted, and like numerals refer to like elements throughout. In the following descriptions, terms such as "include" or "have" refer to presence of features, numbers, steps, operations, elements or combination thereof, and do not exclude presence or addition of one or more other features, numbers, steps, operations, elements or combination thereof.

Terms to be used in the following descriptions will be selected as general terms currently used as widely as possible taking functions of elements into account, but may be varied depending on intent of those skilled in the art, precedents, the advent of new technology, etc. For example, there may be an arbitrarily selected term. In this case, the meaning of the term will be explained in detail through the relevant detailed descriptions. Therefore, the terms set forth herein have to be read in light of its meaning and content throughout the following descriptions rather than naming.

In the following descriptions, terms such as "include" or "have" refer to presence of features, numbers, steps, operations, elements or combination thereof, and do not exclude presence or addition of one or more other features, numbers, steps, operations, elements or combination thereof.

A "portion" or a "unit" set forth herein refers to software or hardware such as a dedicated processor, processing circuitry (e.g., a CPU), FPGA or ASIC, or the like, and performs certain roles. However, the meaning of the "portion/unit" is not limited to software or hardware. The "portion/unit" may be configured to be present in a storage medium for addressing or may be configured to reproduce one or more processors. For example, the "portion/unit" includes software elements, object-oriented software elements, class elements, task elements and the like elements, and processes, functions, attributes, procedures, subroutines, segments of a program code, drivers, firmware, a microcode, a circuit, data, a database, data structures, tables, arrays and variables. The function provided in the elements and the "portions/units" may be carried out by combining fewer elements and "portions/units" or may be subdivided by additional elements and "portions".

For clarity, elements not directly related to the elements of the example embodiment may be omitted, and like numerals refer to like elements throughout.

Figure 1:
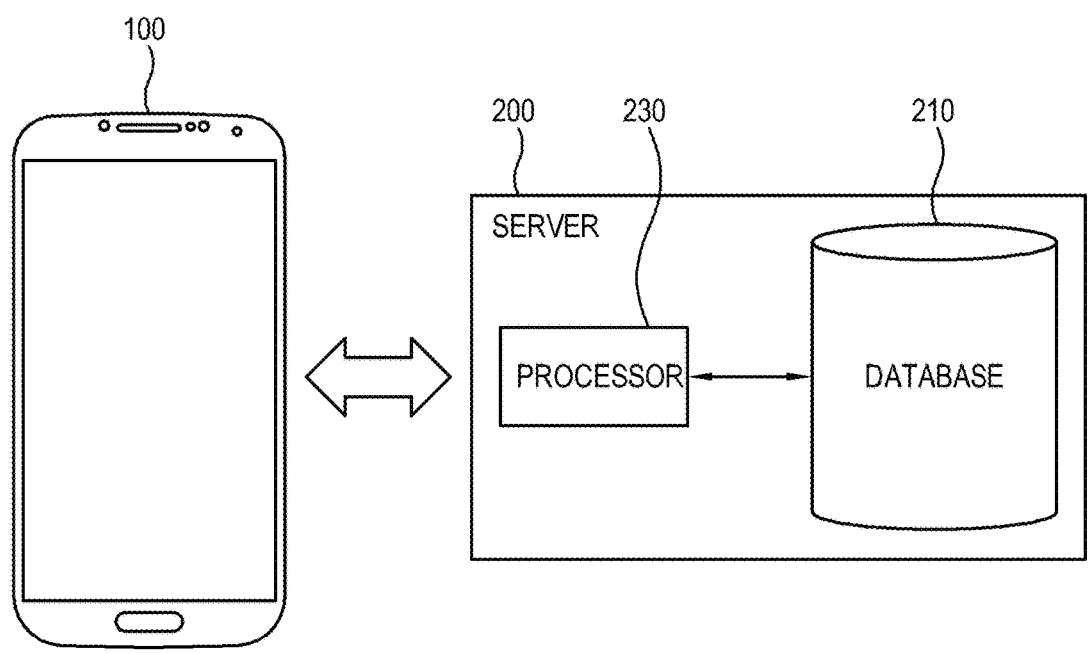
FIG. 1 is a diagram illustrating an example of an event recommendation system according to an example embodiment.

FIG. 1 is a diagram illustrating an example of an event recommendation system 1 according to an example embodiment.

The event recommendation system 1 according to an example embodiment determines a user's intent with regard to a predetermined object based on a keyword extracted from a user's input data for the corresponding object, and recommends him/her the next event following the corresponding object by taking his/her intent into account. As illustrated in FIG. 1, the recommendation system 1 according to an example embodiment includes a terminal 100 and a server 200.

According to an example embodiment, the terminal 100 may be achieved by a smart phone, a tablet computer or the like smart pad, a smart television (TV), a desktop computer, a laptop computer (or a notebook computer), a personal digital assistant (PDA), a personal mobile information terminal, or various stationary or mobile digital devices, or the like, but is not limited thereto. FIG. 1 illustrates an example case where the terminal 100 is the smart phone.

The server 200 provides an event-recommendation service to a user through the terminal 100. To this end, the server 200 may include a database 210 built reflecting a user's intent with regard to a plurality of events to be recommended. According to an example embodiment, the server 200 may include the database 210 and at least one processor (e.g., including processing circuitry) 230 as illustrated in FIG. 1.

The server 200 is accessed by a plurality of terminal through a wired or wireless network. That is, a user accesses the server 200 through the terminal 100 and receives the event-recommendation service. To this end, the server 200 may further include a wired/wireless communication module (not shown) for network communication.

In this embodiment, the server 200 is operated by a service provider, and the service provider includes a business operator of a portal site such as Google, a communication business operator, a terminal manufacturer, etc.

The event-recommendation service is an interactive service optimized/customized for a user, which is provided to recommend a user an optimized event based on the database 210 built reflecting a user's intent learned by analyzing a user's input data to a predetermined object (or target).

A user's input data includes various types of content such as not only a text but also a picture (still image) or a moving picture. In this embodiment, a user's input data includes one or more user reviews on a predetermined travel destination (or a tourist spot) posted on a travel destination related site. Further, a user's input data is receivable in various forms such as a short message service (SMS), a social network service (SNS), an E-mail, etc. and includes a user's voice.

Here, the text and the voice may include at least one keyword as a natural language to guess a user's intent. Further, if a user's input data may be for example a picture or a moving picture, a corresponding picture file or a moving picture file may include meta data such as photographed date, location, etc. In this case, at least a part of the meta data may be utilized as the keyword for guessing a user's intent. In this embodiment, a user's input data may be given in a predetermined language, for example, English data.

Thus, the terminal 100 according to an example embodiment extracts at least one keyword from a user's input data with respect to a predetermined object, and learns a user's intent to the corresponding object based on the extracted keyword. In addition, the terminal 100 reflects the learned user intent in order to recommend the next event proper to a user based on a user's intent to the objects included in the database 210 of the server 200.

The database 210 unrestrictedly stores data under control of the processor 230. The database 210 may include at least one nonvolatile storage medium such as a flash memory and a hard disk drive. The database 210 is accessed by the terminal 100 of a user or an administrator under control of the processor 230, and allows the terminal 100 to read/write/modify/delete/update the data.

The data stored in the database 210 may for example include an operating system for driving the server 200, various applications executable on the operating system, image data, additional data, etc.

The database 210 in this embodiment may store a travel-destination network (to be described later) as a kind of network model for providing the event-recommendation service. The travel-destination network stored in the database 210 is displayed on a display 190 of the terminal 100 that receives the event-recommendation service.

At least one processor 230 establishes the travel-destination network for providing the event-recommendation service in the database 210 based on the review data about the plurality of objects.

The processor 230 may include various processing circuitry that loads and executes a necessary program from the nonvolatile memory such as a read only memory, ROM storing programs to a volatile memory such as a random access memory, RAM. The processor 230 according to an example embodiment may include various processing circuitry, such as, for example, and without limitation, at least one general-purpose processor such as a central processing unit (CPU), a dedicated processor, an application processor (AP), a microcomputer (MICOM) and the like. For example, various operations of the server 200 are carried out by loading a program corresponding to a predetermined algorithm from the ROM to the RAM and executing the program.

If the processor 230 is achieved by a single processor, for example, the CPU, the CPU may build the database 210 for providing various functions, e.g. the event-recommendation service to be carried out in the server 200, and control the wired/wireless network communication with an external device including the terminal 100.

The processor 230 may include a single core, dual cores, triple cores, quad cores and its multiple cores. The processor 230 may include a plurality of processors, for example, a main processor and a sub processor. The sub processor is provided to operate in a standby mode (or a sleep mode) where the server 200 idles with supply of only standby power.

The processor 230, the ROM and the RAM may be connected with one another through an internal bus.

According to an example embodiment, the server 200 may further include a graphic processing unit (GPU, not shown) for graphic processing in addition to the CPU. In this embodiment, the processor 230 includes the GPU, and the processor may be for example given in the form of a system on chip (SoC) where the core and the GPU are combined.

Below, the terminal 100 will be described in greater detail with reference to accompanying drawings.

Figure 2:
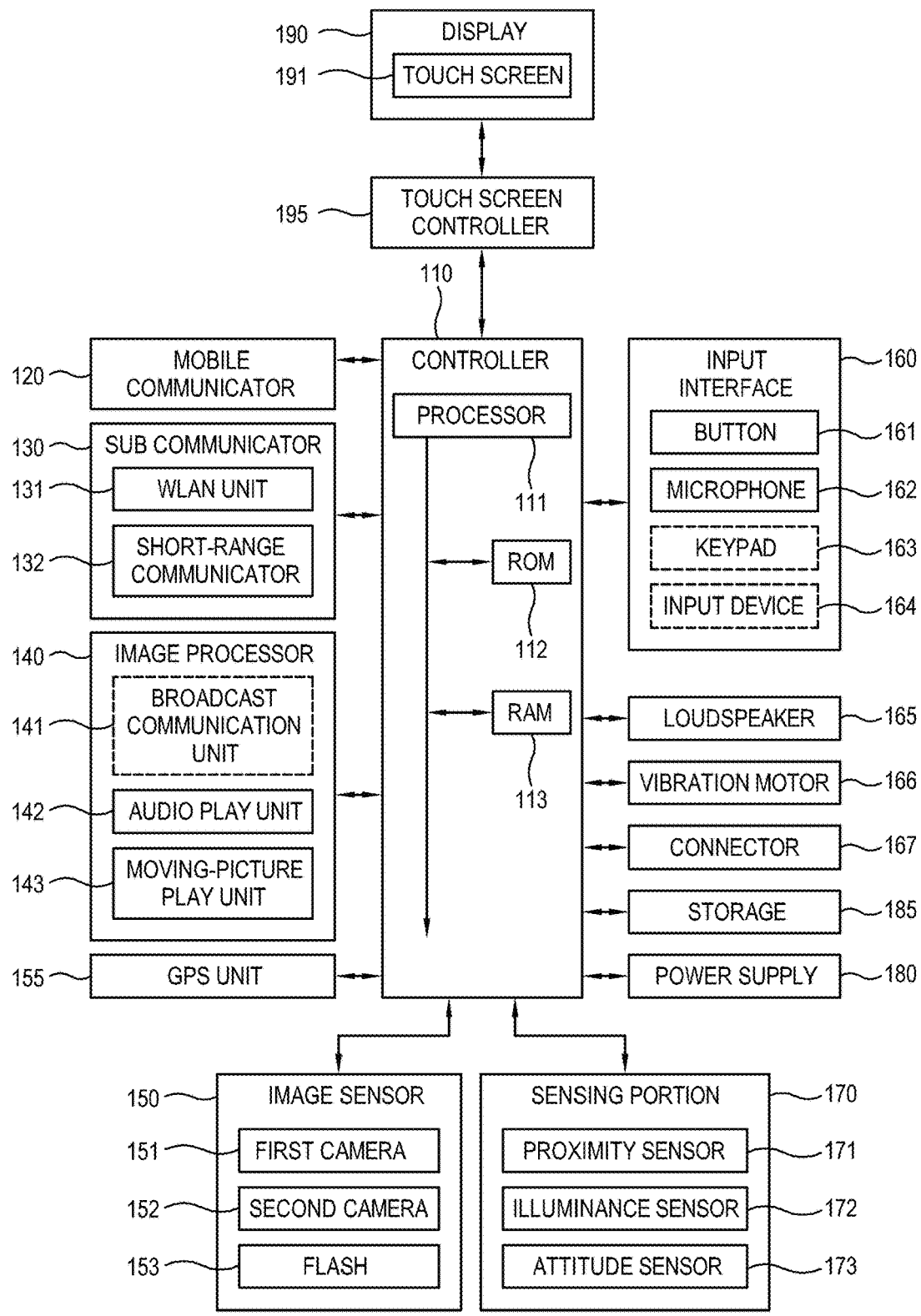
FIG. 2 is a block diagram illustrating an example terminal according to an example embodiment.

FIG. 2 is a block diagram of the terminal 100 according to an example embodiment.

In this embodiment, the terminal 100 may be wirelessly connected to the server 200 or the like device through a mobile communicator (e.g., including communication circuitry) 120 or a sub communicator (e.g., including communication circuitry) 130, which will be described later, and share content as the data is transmitted/received. According to an example embodiment, the terminal 100 may refer, for example, to a device that includes a touch screen 191 and a communicator 120, 130 for transmitting/receiving data.

In the terminal 100 according to an example embodiment, an input interface may include various interface circuitry, such as, for example, and without limitation, one or more of a physical button 161, a keypad 163 displayed on the touch screen 191, and a separate input device (e.g. a pointing device) for a user's touch input. The input interface may receive a touch of a user's body (e.g. a finger) on the touch screen 191. The input unit transmits various preset control commands or information corresponding to a user's input including a touch input to the controller 110.

As illustrated in FIG. 2, the terminal 100 includes the touch screen 191 as the display 190, and includes a touch screen controller 195. The terminal 100 includes the controller 110, the mobile communicator 120, the sub communicator 130, an image processor 140, an image sensor 150, a global positioning system (GPS) unit 155, an input interface 160, a sensing portion 170, a storage 185 and a power supply 180.

The sub communicator 130 includes various communication circuitry, such as, for example, and without limitation, at least one between a wireless local area network (WLAN) unit 131 and a short-range communicator 132. The image processor 140 includes at least one of a broadcast communication unit 141, an audio play unit 142 and a moving-picture play unit 143. The image sensor 150 includes at least one of a first camera 151 and a second camera 152. The input interface 160 includes various interface circuitry, such as, for example, and without limitation, at least one of a button 161, a microphone 162, a loudspeaker 165, a vibration motor 166, a connector 167, a keypad 163 and an input device 164. The sensing portion 170 includes a proximity sensor 171, an illuminance sensor 172 and an attitude sensor 173.

The controller 110 may include various processing circuitry, such as, for example, and without limitation, at least one processor 111, a ROM 112 in which a control program for controlling the terminal 100 is stored, and a RAM 113 in which a signal or data received from the outside of the terminal 100 is stored or which is used as an area for storing various jobs performed in the terminal 100.

The controller 110 controls general operations of the terminal 100, controls signal flow between internal elements 120 to 195 of the terminal 100, and processes a function of processing data. The controller 110 controls the power supply 180 to supply power to the internal elements 120 to 195. Further, in response to a user's input or if a set and stored condition is satisfied, the controller 110 executes an operating system (OS) and various applications stored in the storage 185.

According to an example embodiment, the controller 110 includes the processor 111, the ROM 112 and the RAM 113. The processor 111 includes at least one general-purpose processor such as a central processing unit (CPU), a dedicated processor, an application processor (AP), a microcomputer (MICOM), etc., which for example loads a program corresponding to a predetermined algorithm stored in the ROM 112 to the RAM 113, thereby executing the program to perform various operations of the terminal 100.

The processor 111 may include a single core, dual cores, triple cores, quad cores and its multiple cores. The processor may include a plurality of processors, for example, a main processor and a sub processor. The sub processor is provided to operate in a standby mode (or a sleep mode) where the terminal 100 idles with supply of only standby power.

The processor 111, the ROM 112 and the RAM 113 may be connected with one another through an internal bus.

According to an example embodiment, the processor 111 may further include a graphic processing unit (GPU, not shown) for graphic processing. For example, if the terminal 100 is a smart phone, a smart pad or a smart TV, the processor 111 may be for example given in the form of a system on chip (SoC) where the core (not shown) and the GPU (not shown) are combined.

According to another example embodiment, if the terminal 100 is a desktop computer or a laptop computer, the controller 110 may further include a separate GPU for graphic processing.

According to still another example embodiment, the controller 110 may further include a program for performing a certain function supported in the terminal 100, for example, a function of sensing an error in a predetermined element such as the main processor, and a chip, e.g. an integrated circuit (IC) provided as a processor dedicated for executing the corresponding program.

The controller 110 may control the mobile communicator 130, the sub communicator 130, the image processor 140, the image sensor 150, the GPS unit 155, the user input interface 160, the sensing portion 170, the storage 185, the power supply 180, the touch screen 191 and the touch screen controller 195.

The mobile communicator 130 may connect with an external device, e.g. other devices through mobile communication using one or at least two antennas (not shown) under control of the controller 110. The mobile communicator 130 transmits/receives a wireless signal for a voice call, a video call, a short message service (SMS), a multimedia messaging service (MMS) and data communication with a cellular phone with a phone number, a smart phone, a tablet computer or other terminals connectable with the terminal 100.

The sub communicator 130 may include various communication circuitry, such as, for example, and without limitation, at least one of the WLAN unit 131 and the short-range communicator 132. For example, the subs communicator 130 may include only the WLAN unit 131, only the short-range communicator 132 or both the WLAN unit 131 and the short-range communicator 132.

The WLAN unit 131 may wirelessly connect with an access point (AP) in a place, where the access point (AP) is installed, under control of the controller 110. The WLAN unit 131 supports WLAN standards (IEEE802.11x) of Institute of electrical and electronics engineers (IEEE). Further, the short-range communicator 132 may perform short-range communication with another device, e.g. an external device wirelessly without the access point (AP) under control of the controller 110. The short-range communication may include at least one of Bluetooth, Bluetooth low energy, Infrared data association (IrDA), wireless fidelity (Wi-Fi), Wi-Fi Direct, Ultra-Wideband (UWB), near field communication (NFC), etc.

The terminal 100 may include at least one of the mobile communicator 130, the WLAN unit 131 and the short-range communicator 132 in accordance with performance. For example, the terminal 100 may include combination of two or more among the mobile communicator 130, the WLAN unit 131, and the short-range communicator 132 in accordance with performance.

According to an example embodiment, the sub communicator 130 connects with another device (e.g. the server 200) under control of the controller 110, and transmits/receives data. Such an operation of transmitting/receiving the data refers to sharing content with another device.

According to this example embodiment, the communicator is construed as one of the mobile communicator 120 and the sub communicator 130, or construed as including both the mobile communicator 120 and the sub communicator 130.

The image processor 140 may include the broadcast communication unit 141, the audio play unit 142 or the moving picture play unit 143. The broadcast communication unit 141 receives a broadcast signal (e.g. a TV broadcast signal, a radio broadcast signal or a data broadcast signal) and broadcast additional information (e.g. an electric program guide (EPG) or an electric service guide (ESG)) from an external broadcasting station through a broadcast communication antenna (not shown) under control of the controller 110. Further, the controller 110 may process the received broadcast signal and broadcast additional information through a video codec unit and/or an audio codec unit so that they can be reproduced in the display 190 and/or the loudspeaker 165.

The audio play unit 142 processes an audio source (e.g. an audio file with a file extension such as mp3, wma, ogg or wav) stored in the storage 185 of the terminal 100 or received from the outside to be reproduced in the loudspeaker 165 under control of the controller 110.

In this embodiment, the audio play unit 142 may use the audio codec unit to reproduce acoustic feedback (e.g. an output or the like of an audio source stored in the storage 185) corresponding to a touch or a continuous touching motion detected on the touch screen 191 under control of the controller 110.

The moving picture play unit 143 uses the video codec unit to reproduce a digital moving picture video source (e.g. a file with a file extension such as mpeg, mpg, mp4, avi, mov, or mkv) stored in the storage 185 of the terminal 100 or received from the outside under control of the controller 110. Most of applications installable in the terminal 100 are capable of reproducing the audio source and/or the moving picture file through the audio codec unit and/or the video codec unit.

According to an example embodiment, the moving picture play unit 143 uses the video codec unit to reproduce visual feedback (e.g. an output of the moving picture source stored in the first storage 185) corresponding to a touch or a continuous touching motion detected on the touch screen 191 under control of the controller 110.

By the way, it will be easily appreciated by a person having an ordinary skill in the art that many kinds of video and audio codec units are available. In this embodiment, the image processor 140 may include the audio play unit 142 and the moving-picture play unit 143 without the broadcast communication unit 141 in accordance with the performance or structure of the terminal 100. Further, the audio play unit 142 and/or the moving-picture play unit 143 of the image processor 140 may be included in the controller 110. According to an example embodiment, the video codec unit may include one or at least two video codec units. Further, the audio codec unit according to an example embodiment may include one or at least two audio codec units.

The image sensor 150 may include at least one of a front first camera 151 and a back second camera 152 for photographing a still image or a moving picture under control of the controller 110. The image sensor 150 may include one or both the first camera 151 and the second camera 152. Further, the image sensor 150 may additionally include an auxiliary light source (e.g. a flash 153) to give more light when the first camera 151 or the second camera 152 takes a photograph.

The input interface 160 may include various interface circuitry, including, for example, and without limitation, at least one among one or at least two buttons 161, the microphone 162, the keypad 163 and the input device 164.

The buttons 161 include at least one among a menu button, a home button and a back button which are placed in a front lower portion. The buttons 161 may include a power/lock button and/or a volume button which are placed at a lateral side. Here, the buttons 161 of the terminal 100 may be achieved by not a physical button but a touch button displayed on the touch screen 191. Further, the button 161 of the terminal 100 may be displayed as a text or icon on the touch screen 191.

According to this example embodiment, the input interface 160 of the terminal 100 may receive a user's input corresponding to a touch or touch gesture, e.g. interaction with content displayed on the touch screen 191.

The microphone 162 generates an electric signal based on a voice or sound received from the outside under control of the controller 110. The electric signal generated in the microphone 162 is converted by the audio codec unit and then stored in the storage 185 or output through the loudspeaker 165. One or at least two microphones 162 may be placed in the front, lateral side and back of the terminal 100.

The keypad 163 may receive a key input from a user to control the terminal 100. The keypad 163 includes at least one among a physical keypad (not shown) provided on the front of the terminal 100, a virtual keypad (not shown) displayed within the touch screen 191, and an external keypad (e.g. a keyboard dock (not shown)) connected by a wire or wirelessly. If the keypad 163 is the external keypad, a key input signal from a user is received through the sub communicator 130 or the connector 167.

It will be easily appreciated by a person having an ordinary skill in the art that the physical keypad formed on the front of the terminal 100 may be excluded in accordance with the performance or structure of the terminal 100.

The input device 164 may touch or select an object (e.g. a menu, a text, an image, a video, a figure, an icon and a shortcut icon) displayed on the touch screen 191 of the terminal 100. The input device 164 may touch or select content as an object displayed on the touch screen 191 of the terminal 100. According to this example embodiment, the content includes an application installed in the terminal 100, image data photographed through the cameras 151 and 152, media data stored in the storage 185, text data such as a document or a contact number, or the like data that can be exchanged with other devices.

The input device 164 may input a letter or the like by using the virtual keyboard or touching a capacitive-type, resistive-type or electromagnetic induction-type touch screen. The input device 164 may for example include a pointing device, a stylus, a haptic pen in which a built-in pen vibrating element (e.g. a vibration motor or an actuator) vibrates corresponding to control information received from the communicator 130 of the terminal 100, etc. Further, the vibrating element may vibrate corresponding to not the control information received from the terminal 100 but sensing information sensed by a built-in sensor (e.g. an acceleration sensor, not shown) of the input device 164. The input device 164 may be inserted in an insertion hole of the terminal 100. It will be easily understood by a person having an ordinary skill in the art that the input device 164 may be excluded in accordance with the performance or structure of the terminal 100.

According to an example embodiment, the terminal 100 may receive a user's input data about a predetermined object through the user input interface 160. For example, a user may make his/her input or selection with respect to a text, a picture, a moving picture, etc. in the form of an SMS, SNS, etc. through the virtual keyboard displayed on the touch screen 191, or make his/her input including a keyword by activating the microphone 162 and uttering a voice.

The loudspeaker 165 may output a sound to the outside of the terminal 100 in accordance with various signals (e.g. a wireless signal, a broadcast signal, an audio source, a moving picture file or a picture, etc.) from the mobile communicator 130, the sub communicator 130, the image processor 140 or the image sensor 150 through the audio codec unit under control of the controller 110.

The loudspeaker 165 may make a sound corresponding to functions performed in the terminal 100 (e.g. a touch sound corresponding to a phone number input, a button sound for taking a picture, etc.). At least one loudspeaker 165 may be placed in the front, lateral side and back of the terminal 100.

In this embodiment, the loudspeaker 165 may output acoustic feedback corresponding to a touch or a continuous touching motion detected on the touch screen 191 under control of the controller 110.

The vibration motor 166 transforms an electric signal into mechanical vibration under control of the controller 110. For example, the vibration motor 166 may include a linear vibration motor, a bar-type vibration motor, a coin-type vibration motor or a piezoelectric vibration motor. If receiving a request for a voice call from another terminal, the vibration motor 166 of the terminal 100 operates in a vibration mode under control of the controller 110. One or at least two vibration motors 166 may be placed in the terminal 100. Further, the vibration motor 166 may vibrate the whole of the terminal 100 or a part of the terminal 100.

The connector 167 may be used as an interface for connecting the terminal 100 with an external device (not shown) or a power source (not shown). Under control of the controller 110, the terminal 100 may transmit the data stored in the storage 185 to the external device or receive data from the external device through a cable connected to the connector 167. The terminal 100 may receive power from the power source or charge a battery (not shown) through the cable connected to the connector 167. Further, the terminal 100 may connect with external accessories (e.g. a photo printer, not shown) through the connector 167.

The sensing portion 170 includes at least one sensor for sensing the state of the terminal 100. For example, the sensing portion 170 may include at least one among the proximity sensor 171 placed at a front upper side of the terminal 100 and detecting the proximity of the terminal 100, the illuminance sensor 172 for sensing the quantity of light surrounding the terminal 100, the attitude sensor 173 for sensing the attitude and orientation of the terminal 100, a gravity sensor for sensing the direction of the gravity, and an altimeter for sensing atmospheric pressure and showing the height. The attitude sensor 173 may include a gyrosensor using rotational inertia, an acceleration sensor for sensing gradients of three axes (e.g. an x-axis, a y-axis, a z-axis) with respect to the terminal 100, etc.

The sensing portion 170 is capable of sensing an acceleration corresponding to the sum of a motion acceleration of the terminal 100 and a gravitational acceleration of gravity. If the terminal 100 does not move, the sensing portion 170 senses only the gravitational acceleration. For example, if the terminal 100 faces upward, the gravitational acceleration has a positive (+) direction. On the other hand, if the terminal 100 faces downward, the gravitational acceleration has a negative (−) direction.

At least one sensor included in the sensing portion 170 senses the states of the terminal 100 and generates a signal corresponding to the sensed states, thereby transmitting the generated signal to the controller 110.

It will be easily understood by a person having an ordinary skill in the art that the sensors of the sensing portion 170 may be added or removed in accordance with the performance of the terminal 100.

The GPS unit 155 periodically receives information (e.g. location information and time information of the GPS satellite (not shown) receivable in the terminal 100) from a plurality of GPS satellites (not shown) in the Earth's orbit. Thus, the terminal 100 is informed of its location, speed and/or time based on the information received from the plurality of GPS satellites.

The power supply 180 supplies power to the elements 110 to 170, 155, 185 and 190 of the terminal 100. The power supply 180 includes one or at least two batteries (not shown) placed inside the terminal 100, and supplies power to the elements 110 to 170, 185 and 190 under control of the controller 110. Further, the power supply 180 may use power, which is received from an external power source (not shown) through the cable (not shown) connected to the connector 167, as power for operating the terminal 100 under control of the controller 110.

The storage 185 may store a signal or data input/output corresponding to the operations of the mobile communicator 120, the sub communicator 130, the image processor 140, the image sensor 150, the user input interface 160, the loudspeaker 165, the vibration motor 166, the connector 167, the sensing portion 170, the GPS unit 175 and/or the touch screen 191 under control of the controller 110. The storage 185 may store and a control program for controlling the terminal 100, an application provided by a manufacturer or downloaded from the outside, a graphic user interface (GUI) related to the control program or the application, images for providing the GUI, user information, a document, a database or relevant data.

In this embodiment, the storage 185 may store touch information (e.g. X and Y coordinates of a detected touch position, a detected touch time, etc.) corresponding to a touch and/or a continuous touching motion. The storage 185 may store the kinds of continuous touch motion (e.g. a flick, drag or drag & drop), and the controller 110 determines the kind of touch by comparing a user's touch with the information stored in the storage 185. The storage 185 may further store visual feedback (e.g. a video source, etc.) output to the touch screen 190 in response to an input touch or touch gesture and recognizable by a user, acoustic feedback (e.g. a sound source, etc.) output to the loudspeaker 165 and recognizable by a user, and tactile feedback (e.g. a haptic pattern, etc.) output to the vibration motor 166 and recognizable by a user.

According to an example embodiment, the storage 185 may store an application for providing the event-recommendation service and relevant data, for example, a user's input data, a network model received from the server 200 and/or a variety of relevant data.

In the foregoing terminal 100 according to an example embodiment, the controller 110 receives a user's input data about a predetermined object through the user input interface 160, and learns a user's intent to the corresponding object based on at least one keyword extracted from the received user input data. Here, the controller 110 can learn, e.g. analogize a user's intent based on the data stored in the storage 185 and/or data stored in the server 200 accessible using at least one between the mobile communicator 120 and the sub communicator 130.

The server 200 collects review data with respect to a plurality of events, and establishes a network model reflecting unique characteristic of each of the plurality of events based on the collected review data. The established network model may be stored in the database 210 of the server 200.

The controller 110 controls the terminal 100 to access the server 200 through the communicator 120, 130 and receive data related to the network model from the database 210. Here, the received data may be the whole or a part of the network model. For example, the controller 110 may selectively receive information, which is related to an object corresponding to a user's input data and a keyword extracted from the user input data, from the server 200, and the received data may be stored in the storage 185.

The controller 110 may recommend an event following an object corresponding to a user's input data, based on similarity between the corresponding object and the event included in the network model. Here, the controller 110 may determine the similarity between the object and each event to correspond to a user's intent learned using the extracted keyword, and thus recommend an event suitable for a user of the terminal 100 among the plurality of events The controller 110 makes the event be recommended by various functions supported in the terminal 100. For example, a user can check the recommended event through an application (e.g. a web-browsing application, an SNS application) of providing the event-recommendation service, an SMS, etc., and the recommended event may be provided as content corresponding to a single or combination of a text, a moving picture, a picture, a voice message, etc.

According to an example embodiment, the object includes travel destinations a user has previously visited, and a user's intent includes a user's visit intent to the travel destination. Accordingly, the event may include a travel destination, e.g. the next destination recommendable based on a user's visit intent to the previously visited travel destination.

Below, there will be described in more detail an example embodiment of determining a user's visit intent according to the travel destinations and recommending a user the next travel destination based on the determined user visit intent.

Figure 3:
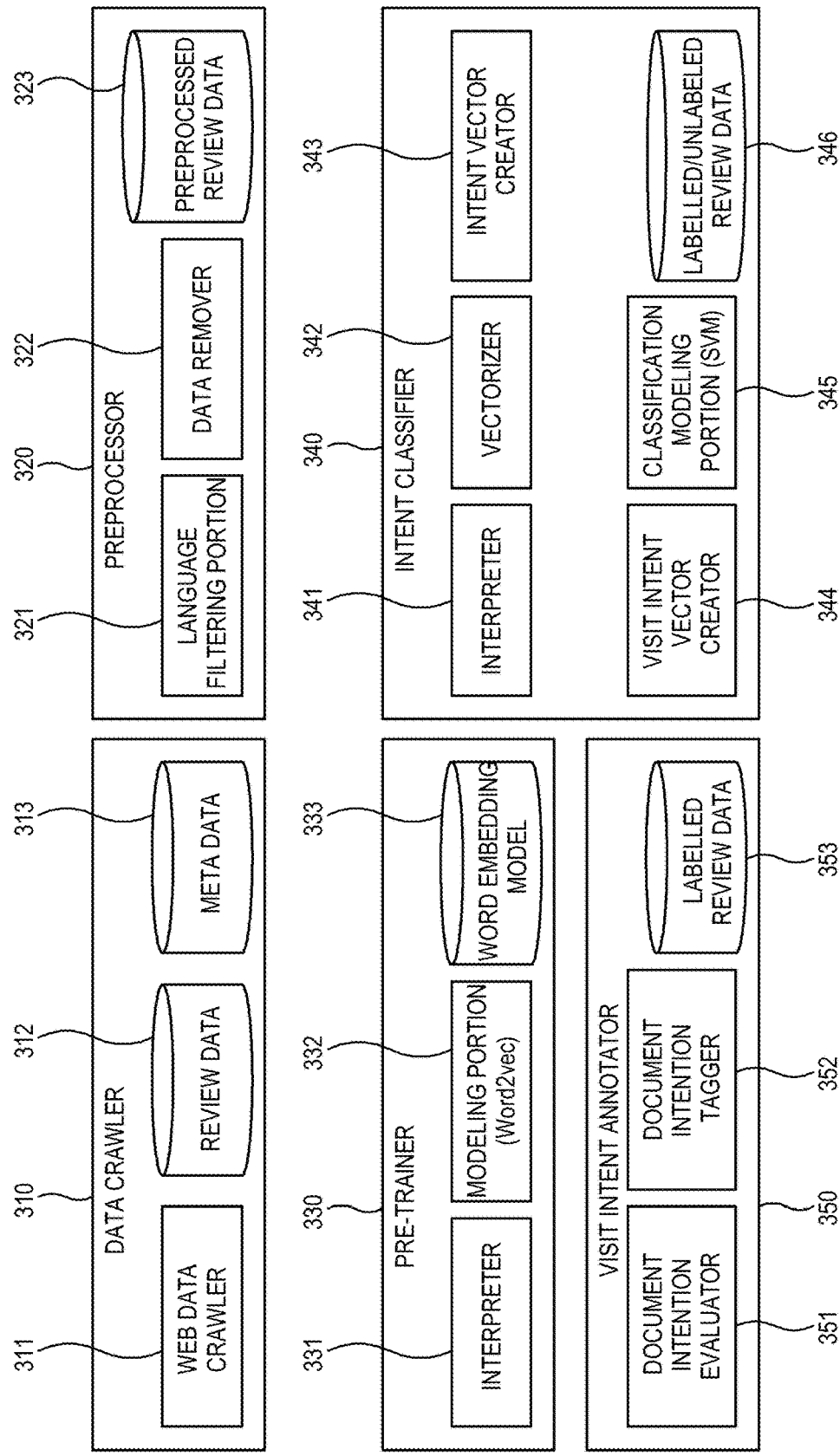
FIG. 3, FIG. 7 and FIG. 12 are block diagrams illustrating an example system for providing a travel-destination recommendation service according to an example embodiment.
Figure 7:
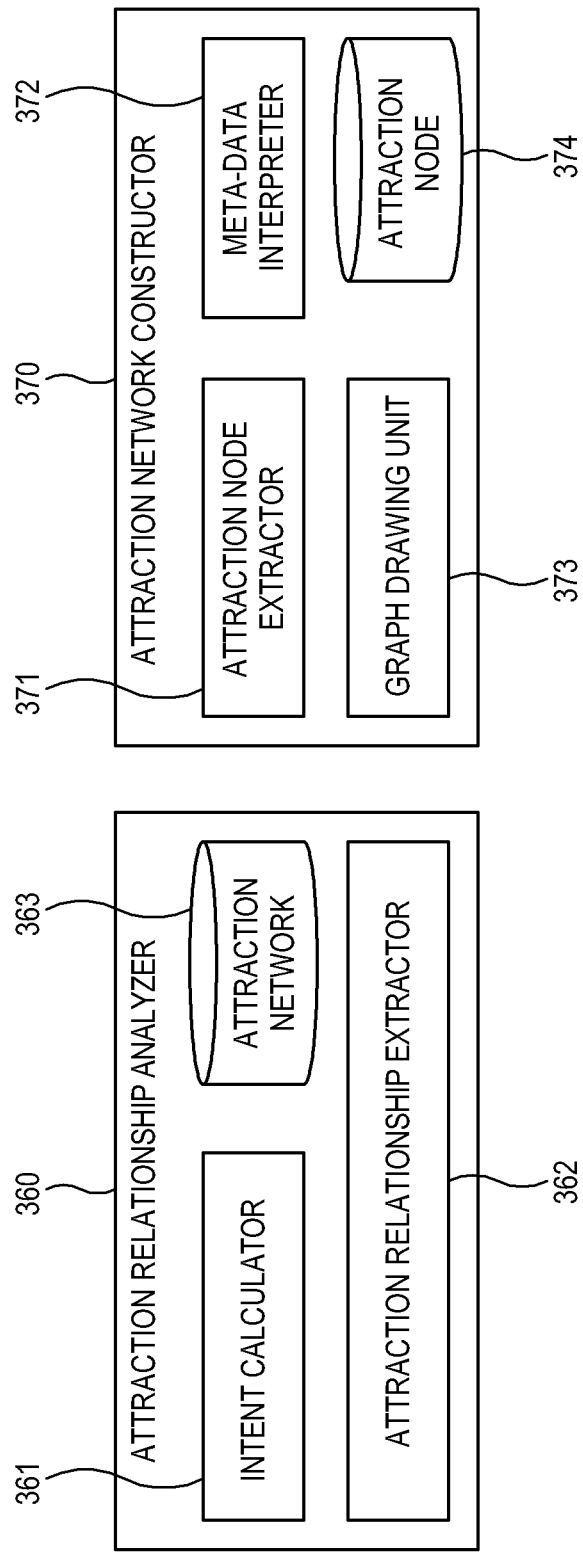
Figure 12:
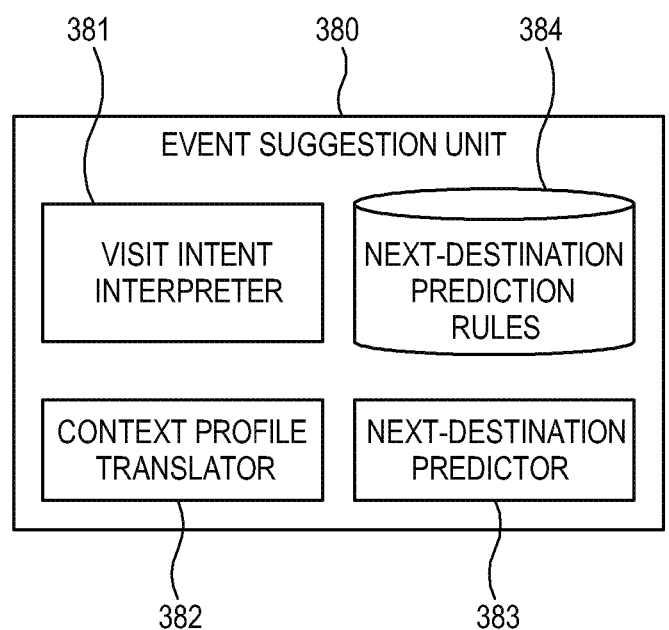

FIG. 3, FIG. 7 and FIG. 12 are block diagrams illustrating an example system for providing a travel-destination recommendation service according to an example embodiment;

The service providing system according to an example embodiment may include a data crawler 310, a preprocessor 320, a pre-trainer 330 and an intent classifier 340 as illustrated in FIG. 3.

Here, the data crawler 310, the preprocessor 320, the pre-trainer 330 and the intent classifier 340 may be provided in the server 200. A server administrator uses an administrator terminal (not shown) such as a computer or a host device to establish the network model for the travel-destination recommendation service in the server 200. In this embodiment, the administrator terminal may be the server 200.

According to an example embodiment, the system for providing the travel-destination recommendation service may for example collect review data (e.g. a text, a voice uttered by a user, etc.) about various travel destinations from travel related websites such as TripAdvisor, Yelp, Bookings.com, etc., and learns linguistic qualification for analyzing/classifying intent based on a text by the text mining technique such as word embedding. In addition, the intent classification training and review data annotation tagging are achieved using a classification algorithm based on the learned linguistic qualification.

The system for providing the travel-destination recommendation service utilizes the intent classification technique in the foregoing review data (e.g. the text data) to create an intent vector (hereinafter, referred to as a 'travel-destination intent vector' or a 'place-of-interest (POI) intent vector') to a place of interest (POI) according to the travel destinations, and establishes a network model (hereinafter, referred to as a 'travel destination model' or a 'travel-destination network') based on the intent vector, thereby storing the network model as the database 210 in the server 200. In this embodiment, the network model has a structure where a plurality of nodes (e.g. travel destinations of interest) are connected leaving a predetermined length (e.g. a correlation distance to be described later) according to similarity of a user's intent.

FIG. 3 and FIG. 7 illustrate modules needed for establishing the network model, which are involved in the processor 230 of the server 200 in this embodiment. Operations to be carried out by the modules 310, 320, 330, 340, 360, 370 illustrated in FIG. 3 and FIG. 7 may be also performed by the processor 230 of FIG. 1. Likewise, the modules 312, 313, 323, 333, 343, 346, 353, 363, 374 illustrated in FIG. 3 and FIG. 7 to store the data may be provided in the database 210 illustrated in FIG. 1.

In addition, the travel-destination network established in the server 200 may be used to provide an event suggesting service for suggesting the next destination through the terminal 100. Here, the travel-destination network established in the server 200 may combine with a user's history, context information, a review previously written by a user, etc. and be then used in recommending the next destination.

FIG. 12 illustrates modules needed for suggesting the event, which are involved in the processor 230 of the server 200 in this embodiment. Operations to be carried out by the module 380 of FIG. 12 may be also performed by the processor 230 illustrated in FIG. 1. Likewise, the module 384 illustrated in FIG. 12 to store data may be provided in the database 210 of FIG. 1.

Alternatively, the modules of FIG. 12 may be provided in the terminal 100. In this case, the controller 110 of the terminal 100 receives and stores at least a part of the travel-destination network through communication with the server 200, and provides the next event to a user through the display 190 and/or the loudspeaker 165.

According to an example embodiment, an administrator of the travel-destination recommendation service may establish the travel-destination network in the server 200 through the administrator terminal (not shown). Further, the established travel-destination network may be partially or entirely downloaded in a user's terminal 100, thereby providing the travel-destination recommendation service to a user.

To this end, a plurality of reference items reflecting a user's intent may be utilized in classifying the review data collected from the travel-destination review websites.

Specifically, a visit-intent classification system shown in the following Table 1 may be for example chosen (or selected) as the plurality of reference items for learning, e.g. training a user's visit intent to the travel destinations.

TABLE 1

| Indices | Intents |
|---|---|
| 0 | Business and professional |
| 1 | Eating out |
| 2 | Education and training |
| 3 | Health and medical care |
| 4 | Holidays, leisure and recreation |
| 5 | Religion and pilgrimages |
| 6 | Shopping |
| 7 | Socializing (friends, relatives, family) |

Here, the visit-intent classification system of Table 1 classifies traveler's travel-destination visit intent into eight intents by referring to the travel report of UN, [UNWTO, 2015].

In this embodiment, a user's eight intents as tabulated in Table 1 are used as reference items reflecting the visit intent with respect to the travel destination. However, the reference for classifying a user's intent is not limited to Table 1. In other words, a plurality of reference items may be used for classifying the visit intent according to an example embodiment as long as they can reflect a user's intent with respect to the collected review data.

Below, the modules illustrated in FIG. 3 to provide the travel-destination recommendation service will be described in more detail.

The data crawler 310 crawls the review data (e.g. web data) from the travel-destination review websites. The data crawler 310 may store the crawled review data and its meta data in the form of a database. In this embodiment, the data crawler 310 may include a web data crawler 311 for crawling the web data, a database 312 of the review data, and a database 313 of the meta data as illustrated in FIG. 3.

The database 312 of the review data stores content collected as review data such as a text, an image, a moving picture, etc. The database 313 of the meta data stores a name, latitude and the like location information of a place (e.g. a travel destination), information of a rating and the like as the meta data of the review data. Both the databases 312 and 313 are linked to each other in light of information stored therein.

In this embodiment, the database 312, 313 in the data crawler 310 may be configured to temporarily store information. In other words, the data crawler 310 temporarily stores the review data crawled from the review websites in the database 312, 313, and the review data may be sent to the preprocessor 320 to be described later. Thus, the preprocessed review data is stored in the database 323 of the preprocessor.

The preprocessor 320 preprocesses the crawled review data in the database 210. In this embodiment, the preprocessing may for example include text preprocessing such as language filtering for filtering out a non-English (e.g. Spanish, Chinese, etc.) document from the collected data; irrelevant data cleaning for removing unnecessary data (texts) such as hypertext mark-up language (HTML) code, stopwords or the like that does not reflect user's intent; restoring an original form; etc. For example, if the review data is "Disneyland is wonderful place for kids," the preprocessor 320 may remove "is", "for" and the like words except the effective words the meaning of which are used in determining a user's intent.

In the foregoing example embodiment, if the travel-destination recommendation service is provided in English, the preprocessor 320 filters out a document written in other languages (e.g. non-English), but not limited thereto. That is, if the travel-destination recommendation service is provided in Korean, a document written in other languages except Korean may be filtered out. Further, if the travel-destination recommendation service supports two or more languages or supports a translation function, such a language filtering process may be omitted.

In this embodiment, the preprocessor 320 may include a language filtering portion 321, a data remover 322, and a database 323 in which the preprocessed review data is stored, as illustrated in FIG. 3.

Here, the database 323 in the preprocessor 320 may be configured to temporarily store information. That is, the preprocessor 320 preprocesses the review data received from the data crawler 310, and temporarily stores the preprocessed review data in the database 323. The review data is sent to an intent classifier 340 to be described later, and stored as labeled review data in a database 346 of the intent classifier 340.

The pre-trainer 330 is provided to perform the word embedding with respect to the review data. To this end, the pre-trainer 330 may include an interpreter 331 for interpreting the review data, a modeling portion 332 for establishing a model for performing the word embedding, and a database 333 in which the established word embedding model is stored.

In this embodiment, the modeling portion 332 establishes a model for the word embedding by using a skip-gram model of word2vec [Mikolov et al., 2013] as one of neural-network language modeling approaches. Such an established word embedding model is used in creating the review vector and the intent vector in the intent classifier 340 (to be described later).

The intent classifier 340 classifies the review data preprocessed by the preprocessor 320 according to a user's intent, makes a set of words according to the intents, and uses the word embedding model established in the pre-trainer 310 to extract and average a word vector from the set of words according to the intent, thereby creating the intent vector.

In this embodiment, as illustrated in FIG. 3, the intent classifier 340 may include an interpreter 341, a vectorizer 342, an intent vector creator 343, a visit intent vector creator 344, a classification modeling portion 345, and a visit intent annotation database 346.

The interpreter 341 loads the preprocessed review data from the database 323 of the preprocessor 320 and parses the review data according to sentences and words.

The vectorizer 142 transforms the review data into a vector. Here, the review data of one case may be transformed into one review vector. Further, the word embedding model established in the pre-trainer 330 may be used in transform the review data into the vector.

Figure 4:
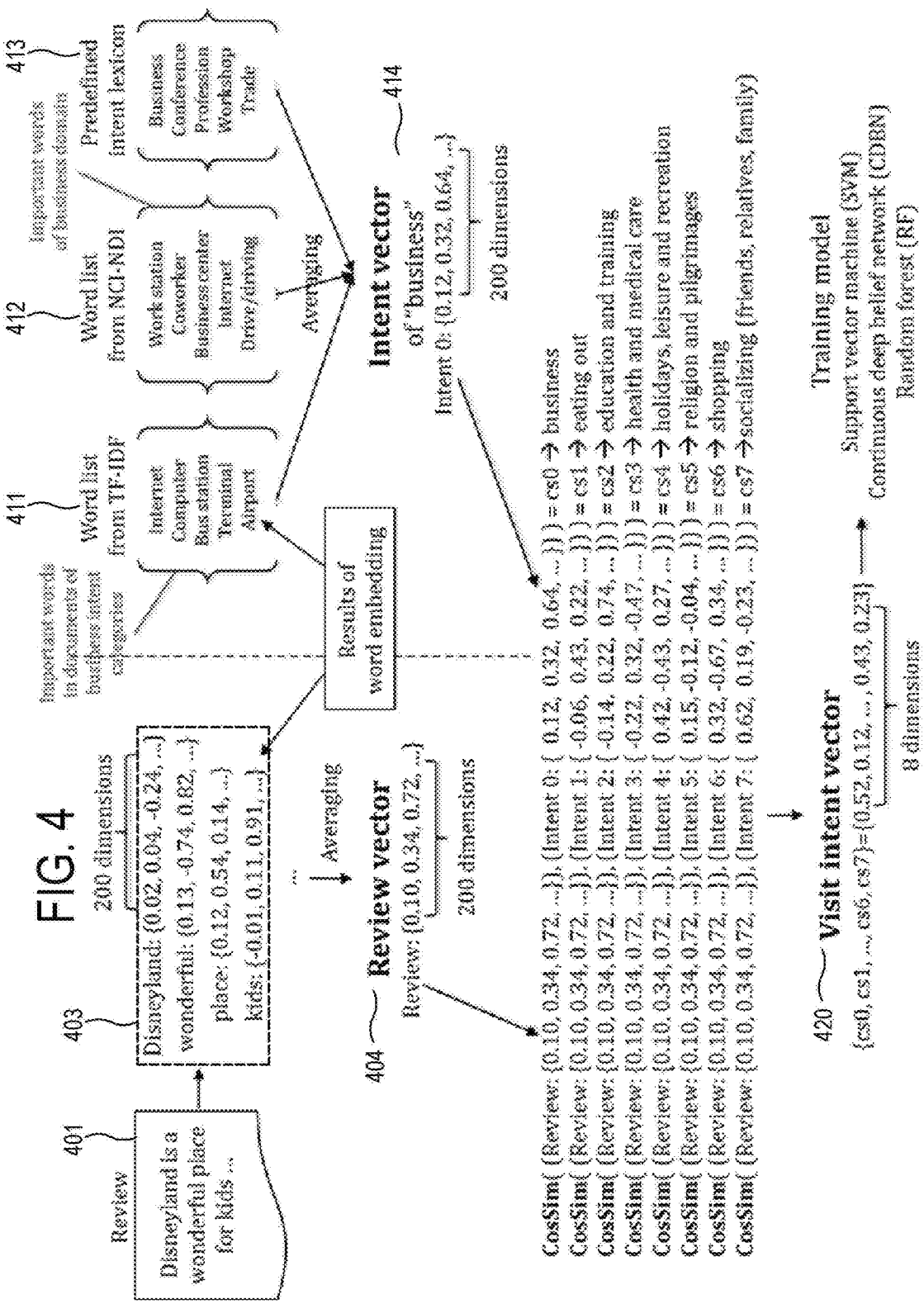
FIG. 4 is a diagram illustrating an example process of classifying review data according to intent by the elements illustrated in FIG. 3.
Figure 5:
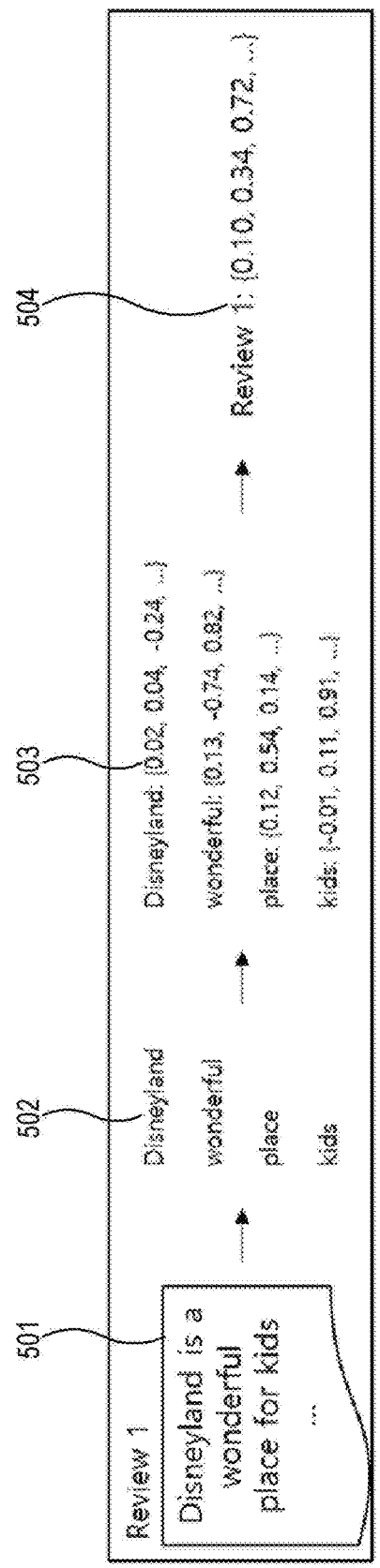
FIG. 5 is a diagram illustrating the review data of one case in FIG. 4 is converted into a review vector.

FIG. 4 is a diagram illustrating an example process of classifying review data according to intent by the elements illustrated in FIG. 3, and FIG. 5 illustrates that the review data of one case in FIG. 4 is converted into a review vector;

As illustrated in FIG. 4 and FIG. 5, words included in the review data, e.g. a keyword 502 has a real number value 403, 503 of 200 dimensions. For example, as illustrated in FIG. 4 and FIG. 5, in the review data 401, 501 of "Disneyland is wonderful place for kids", the effective words 502, e.g. "Disneyland", "wonderful", "place" and "kids" are respectively represented in the form of vectors as follows. Further, the review vector 404, 504 is defined as an average vector of them, and has a real number value of 200 dimensions.

Disneyland: {0.02, 0.04, −0.24, . . . }
wonderful: {0.13, −0.74, 0.82, . . . }
place: {0.12, 0.54, 0.14, . . . }
kids: { −0.01, 0.11, 0.91, . . . }
Review: {0.10, 0.34, 0.72, . . . }

In this embodiment, one piece of the review data 401, 501 (e.g. "Disneyland is wonderful place for kids") is transformed by the vectorizer 342 into one review vector 404, 504 (e.g. Review: {0.10, 0.34, 0.72, . . . }). In this process, the word embedding model of the pre-trainer 330 is utilized.

The intent vector creator 343 makes a training corpus according to a plurality of reference items through the visit intent classification system of Table 1, and extracts a predetermined number of (e.g. k) high-rank words that reflects a user's intent corresponding to each item within the training corpus. Here, the high-rank words are extracted using at least one of term frequency—inverse document frequency (TF-IDF), normalized corpora impurity—normalized domain impurity (NCI-NDI) and the like techniques. As illustrated in FIG. 4, the intent vector creator 343 adds words (e.g. lexicons) 413 showing the previously defined user intent to words 411 extracted through the TF-IDF and/or words 412 extracted through NCI-NDI, thereby making a list of words according to a user's intent.

Referring to FIG. 4, in case of "business" as a user's intent under the classification system of Table 1, words 411 such as "Internet", "Computer", "Bus station", "Terminal" and "Airport" are extracted as the high-rank words through the TF-IDF, and words 412 such as "Work station", "Coworker", "Business center", "Internet", "Drive/driving" are extracted as the high-rank words through the NCI-NDI. Further, "Business", "Conference", "Profession", "Workshop", "Trade", etc. may be added as the previously defined words 413.

In addition, the intent vector creator 343 creates a intent vector 414 through the word embedding model of the pre-trainer 330 with respect to the list of words corresponding to a user's intent. Specifically, the intent vector creator 343 creates the intent vector by averaging the list of words classified according to a user's intent, e.g. the plurality of reference items shown in Table 1. That is, the intent vector is created by averaging the words according to a user's intent in the form of a vector.

For example, the intent vector corresponding to "business" among a user's intents under the intent classification system is obtained as follows.

Intent vector of "business": Intent 0: {0.12, 0.32, 0.64, . . . }

In this example embodiment, a user's intent is classified according to eight reference items shown in Table 1, and therefore a total of eight intent vectors are created corresponding to a user's eight intents by the intent vector creator 343. Here, as shown in Table 1, "Business" is defined as an intent of '0', "Eating out" is defined as an intent 1, "Education and training" is defined as an intent 2, "Health" is defined as an intent 3, "Holidays/leisure" is defined as an intent 4, "Religion" is defined as an intent 5, "Shopping" is defined as an intent 6, and "Socializing" is defined as an intent 7. For example, eight intent vectors created according to a user's intent are as follows.

Intent 0: {0.12, 0.32, 0.64, . . . }
Intent 1: { −0.06, 0.43, 0.22, . . . }
Intent 2: { −0.14, 0.22, 0.74, . . . }
Intent 3: { −0.22, 0.32, −0.47, . . . })
Intent 4: {0.42, −0.43, 0.27, . . . }

Intent 5: {0.15, −0.12, −0.04, . . . }
Intent 6: {0.32, −0.67, 0.34, . . . }
Intent 7: {0.62, 0.19, −0.23, . . . }

The visit intent vector creator 344 determines similarity between the review vector created by the vectorizer 342 and each of the plurality of (e.g. 8) intent vectors created by the intent vector creator 343, and assigns the similarity as the visit intent vector 420. To determine the similarity, a cosine similarity coefficient is determined with respect to each of the plurality of intent vectors. In case of eight intent vectors, the visit intent vector is a vector of eight dimensions.

According to an example embodiment, cosine similarity coefficients $cs0, cs1, \ldots, cs7$ corresponding to a user's eight intents as shown in Table 1 are determined as follows.

CosSim((Review: {0.10, 0.34, 0.72, . . . }), (Intent 0: {0.12, 0.32, 0.64, . . . }))=cs0

CosSim((Review: {0.10, 0.34, 0.72, . . . }), (Intent 1: {−0.06, 0.43, 0.22, . . . }))=cs1

CosSim((Review: {0.10, 0.34, 0.72, . . . }), (Intent 2: {−0.14, 0.22, 0.74, . . . }))=cs2

CosSim((Review: {0.10, 0.34, 0.72, . . . }), (Intent 3: {−0.22, 0.32, −0.47, . . . }))=cs3

CosSim((Review: {0.10, 0.34, 0.72, . . . }), (Intent 4: {0.42, −0.43, 0.27, . . . }))=cs4

CosSim((Review: {0.10, 0.34, 0.72, . . . }), (Intent 5: {0.15, −0.12, −0.04, . . . }))=cs5

CosSim((Review: {0.10, 0.34, 0.72, . . . }), (Intent 6: {0.32, −0.67, 0.34, . . . }))=cs6

CosSim((Review: {0.10, 0.34, 0.72, . . . }), (Intent 7: {0.62, 0.19, −0.23, . . . }))=cs7

In addition, the determined cosine similarity coefficients $cs0, cs1, \ldots, cs7$ are assigned as a vector of eight dimensions, and thus the visit intent vector is created as follows.

Visit intent vector: {cs0, cs1, . . . , cs6, cs7}= {0.52, 0.12, . . . , 0.43, 0.23}

Such a created visit intent vector is labeled or indexed to the corresponding review data (e.g. "Disneyland is wonderful place for kids").

The classification modeling portion 345 trains the classifier of receiving the review vector and the intent vector so that such a labeled review data can be classified. The classification modeling portion 345 may employ a classification algorithm (or a classification technique) corresponding to one of modules for learning the intent classification qualification, such as a random forest, a continuous deep belief network, a support vector machine (SVM), etc. According to an example embodiment, the support vector machine (SVM) excellent in performance may be selected.

Thus, the database 346 of the intent classifier 340 may store both review data (e.g. a labeled review) obtained by adding or labeling an annotation to the visit intent vector and unlabeled review data (e.g. unlabeled review).

In the foregoing intent classifier 340, a set of words according to a user's intent is made to thereby obtain the intent vector and the visit intent vector, and this may be stepwise represented as follows.

1. For each intent, create an intent vector using statistical measures and predefined lexicons
<Available Statistical Measures>
(1) Term frequency—inverse document frequency (TF-IDF) (top-k)
(2) Normalized corpora impurity—normalized domain impurity (NCI-NDI) (top-k)
A favorable term has low NCI (e.g. appears mainly in the concerned domain) and high NDI (e.g. appears uniformly in documents of the same domain) [Liu et al., 2005]

<Predefined Intent Lexicon>
(3) ⓪:[conference, profession, . . . ], . . . , ⑦:[party, gathering, . . . ] (0~15 words per intent with respect to a user's intent ⓪business, ①eating out, ②Education and training, ③health, ④holidays/leisure, ⑤religion, ⑥shopping and ⑦socializing)

Combine the three sets of lists (1)-(3), and create the intent vectors by averaging word vectors (created by the word embedding)

Intent 0: {0.12, 0.32, 0.64, . . . }, . . . , intent 7: {0.62, 0.19, −0.23 . . . }

2. For each review, compute the visit intent vector from the intent vectors

CosSim((Review 1: {0.10, 0.34, 0.72, . . . }), (Intent 0: {0.12, 0.32, 0.64, . . . }))

. . .

CosSim((Review 1: {0.10, 0.34, 0.72, . . . }), (Intent 7: {0.62, 0.19, −0.23 . . . }))

-->visit intent vector {cs0, . . . , cs7}={0.52, . . . , 0.23}

A classifier takes a review vector and the corresponding visit intent vector to learn the training data set)

Supporting at least one of vector machine (SVM), the continuous deep belief network (CDBN) and the random forest (RF) to compare the performance.

A visit intent annotator 350 senses that a new review is given, and obtains the review vector through the word embedding model of the pre-trainer 330. Thus, the intent classifier 340 utilizes the review vector to obtain the visit intent vector.

The visit intent annotator 350 may include a document intention evaluator 351 for determining the visit intent with respect to a new review, a document intention tagger 352 for inserting the determined visit intent into a visit intent annotation database by labelling the review with the determined visit intent, and a database 353 for storing the reviews tagged, e.g. labelled with the visit intent.

In this manner, the database 353 is built up to store the visit intention annotated review.

According to an example embodiment, the foregoing system for providing the travel-destination recommendation service collects the review documents about various travel destinations from the travel related websites, trains the linguistic qualification through the intent classification by the word embedding technique, and performs the intent classification training and annotation tagging through the classification algorithm based on the trained linguistic qualification.

In addition, the foregoing intent classification technique for the review data is used to create the travel-destination intent vector according to the travel destinations, and thus establishes the travel-destination network.

Specifically, the system for providing the travel-destination recommendation service according to an example embodiment creates the travel-destination intent vector for a predetermined travel destination based on the visit intent vector indexed in the review data, and thus establishes the travel-destination network. The established travel-destination network is used in recommending the next travel destination.

Figure 6:
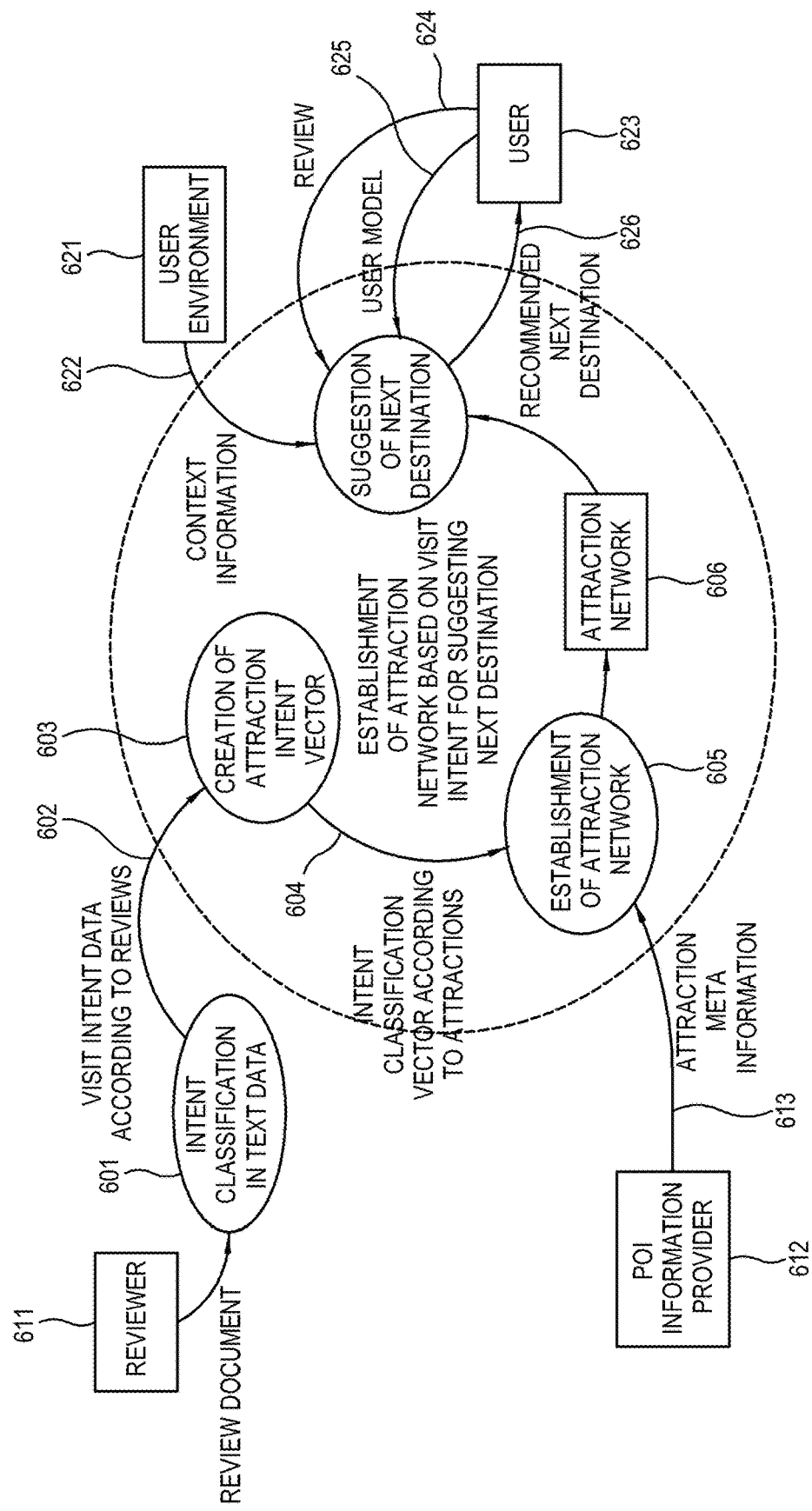
FIG. 6 is a diagram illustrating an example of a travel-destination network being established according to an example embodiment, and the next travel destination is recommended.

FIG. 6 is a diagram illustrating a travel-destination network is established according to an example embodiment, and the next travel destination is recommended;

As described above, if the review data (e.g. "Disneyland is wonderful place for kids") is labelled with the visit intent vector for the intent classification, the visit intent vector is made according to the travel destinations.

According to an example embodiment, as illustrated in FIG. 6, the intent classifier 340 of FIG. 3 classifies the review data (e.g. a review document including text data) written by a plurality of users (e.g. reviewers) 611 to thereby achieve the intent classification (601).

If the intent classification is carried out with respect to the review data, the visit intent vector is obtained corresponding to the review data (602). In addition, the visit intent vector obtained corresponding to the review data is used to create a travel-destination intent vector with respect to a predetermined travel destination (603).

To this end, the system for providing the travel-destination recommendation service may further include an attraction relationship analyzer 360, and an attraction network constructor 370 as illustrated in FIG. 7.

Referring to FIG. 7, an intent calculator 361 of the attraction network constructor 360 collects the review data from the review websites with respect to the plurality of travel destinations, and creates a travel-destination intent vector (e.g. a POI intent vector).

As illustrated in FIG. 7, the attraction relationship analyzer 360 includes the intent calculator (or a total intention calculator) 361 for collecting and averaging the related reviews according to the PIO nodes of the travel-destination network and determining the travel-destination intent vector (e.g. the POI intent vector), an attraction relationship extractor 362 for measuring a correlation distance between the travel-destination intent vectors (e.g. POI intent vectors) at the POI nodes of the travel-destination network and storing the corresponding information as information of an edge (e.g. an edge) between the nodes, and a database 363 for storing the travel-destination network (e.g. an attraction network).

Figure 8:
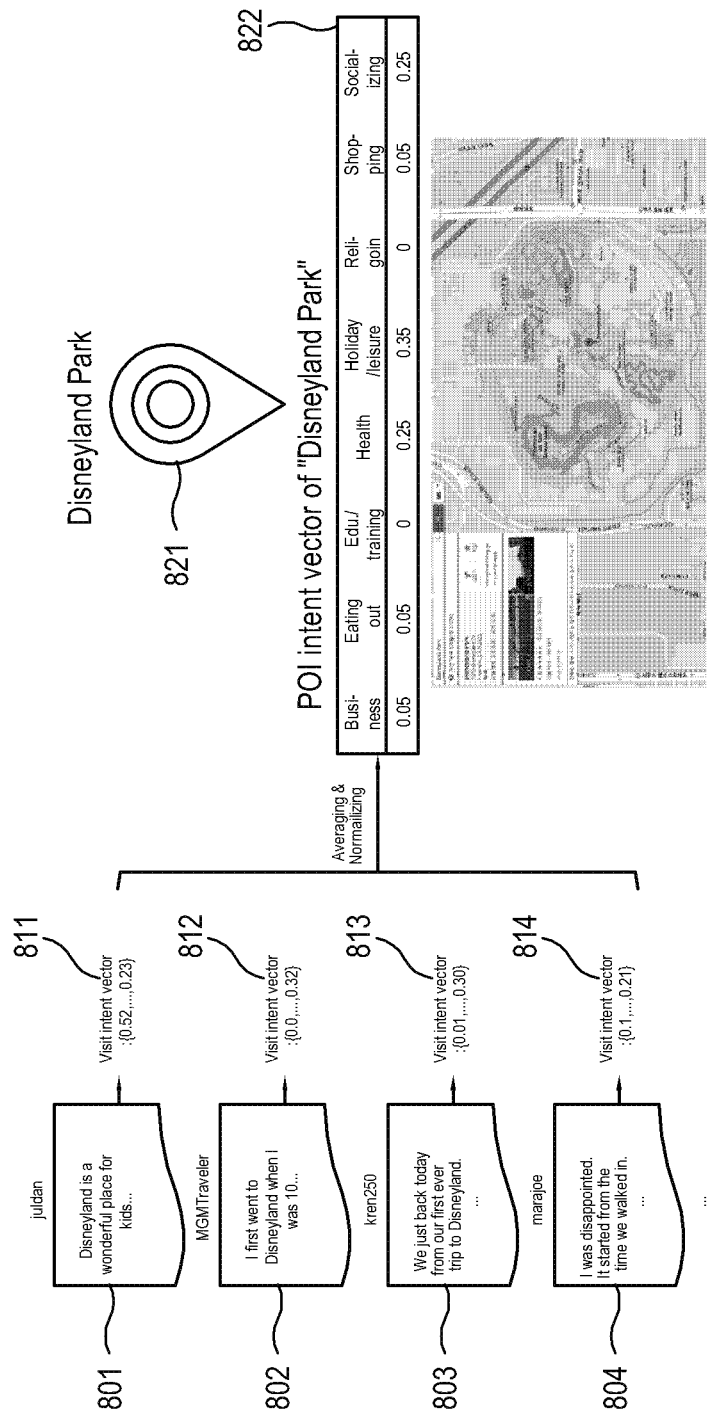
FIG. 8 is a diagram illustrating an example process of creating a travel-destination intent vector with respect to a predetermined travel destination.

FIG. 8 is a diagram illustrating an example process of creating a travel-destination intent vector with respect to a predetermined travel destination.

As illustrated in FIG. 8, various pieces of review data 801, 802, 803 and 804 are collected from a plurality of users (e.g. juldan, MGM Traveler, kren 250, marajoe, etc.) with respect to a predetermined travel destination (e.g. Disneyland Park), and a plurality of visit intent vectors 811, 812, 813 and 814 are determined corresponding to the respective reviews. Referring to FIG. 4, the plurality of determined visit intent vectors 811, 812, 813 and 814 may be respectively represented by vectors of eight dimensions.

In addition, as illustrated in FIG. 8, by averaging & normalizing the plurality of visit intent vectors, the travel-destination intent vector 822 is created as shown in Table 2 with respect to a predetermined travel destination, for example, the Disneyland Park 821.

TABLE 2

| business | eating out | Education and training | health | holidays/ leisure | religion | shopping | socializing |
|---|---|---|---|---|---|---|---|
| 0.05 | 0.05 | 0 | 0.25 | 0.35 | 0 | 0.05 | 0.25 |

According to an example embodiment, the travel-destination intent vector is created by loading a POI and a corresponding review collection from an NoSQL (MongoDB) review database and embedding review documents into a POI document. With this operation, as illustrated in FIG. 8, the POI has a substructure of review documents in a relation of 1:N. The visit intent is classified with respect to all the review documents, and the intent vectors analyzed according to the review documents are combined with respect to the travel destinations, thereby creating a general travel-destination intent vector (e.g. POI intent vector).

Here, the travel-destination intent vectors (e.g. the POI intent vectors) are added up according to the respective dimensions, and normalized into a real number ranging from 0 to 1 to make the sum of eight-dimension vectors be 1.

Alternatively, to create the travel-destination intent vector, the intent vectors may be combined by not normalization but average vector or cosine similarity measures.

In FIG. 8 and Table 2, the travel-destination intent vector is created with respect to the Disneyland Park. However, the travel-destination intent vectors are respectively created with respect to various travel destinations. For example, the travel-destination intent vector may be created with respect to the Golden gate bridge as shown in Table 3.

TABLE 3

| business | eating out | Education and training | Health | holidays/ leisure | religion | shopping | socializing |
|---|---|---|---|---|---|---|---|
| 0.15 | 0.1 | 0 | 0.3 | 0.15 | 0 | 0.1 | 0.2 |

In addition, the travel-destination network (e.g. an attraction network) may be constructed by the attraction relationship analyzer 360 and the attraction network constructor 370 (605), using the travel-destination intent vector created according to the travel destinations (604).

In this embodiment, the intent calculator 361 may create the travel-destination intent vector (e.g. POI intent vector) by collecting the reviews of TripAdvisor from objects of a total of 83,207 travel destinations of in 13 states (e.g. Nevada, New Mexico, Montana, Arizona, Idaho, Alaska, Oregon, Wyoming, Washington, Utah, California, Colorado and Hawaii) of western America.

In addition, the attraction relationship extractor 362 determines a correlation distance of visit intent between the travel destinations based on the created travel destination intent vector (e.g. the POI intent vector), and constructs the travel-destination network based on the information about the correlation distance. Here, the elements of the travel-destination network are defined as follows.

node: each travel destination (with a travel-destination intent vector)

edge: correlation between the travel-destination intent vectors (e.g. the POI intent vectors) of two travel destinations weight: a value of the correlation distance Here, the attraction relationship extractor 362 uses the general travel-destination intent vector (e.g. POI intent vector) to determine the correlation distance between the travel destinations. In this embodiment, if the correlation distance is greater than a predetermined reference value, e.g. 0.8 or if a physical distance is longer than 200 km, the edge between the travel destinations may be removed.

In light of the travel domain, the travel destination is not selected by only a specific visit intent, and the review is not written by only one intent. Therefore, the visit intents classified according to eight reference items are hard to be independent of one another.

In this regard, the correlation distance is employed to measure a distance between dependent dimensions according to this example embodiment. The correlation distance has a real number value ranging from 0 to 2. When the correlation distance is not greater than 0.8 (an experimental value), a network of connecting the travel destinations is constructed. In this embodiment, the correlation distance (X, Y) is determined by the following Equations 1 and 2.

$$\text{Corr}(X, Y) = \frac{\text{Cov}(X, Y)}{\sigma_X \sigma_Y} = \frac{E[(X - E[X])(Y - E[Y])]}{\sigma_X \sigma_Y} =$$
[Equation 1]

$$\frac{\sum_{i=1}^{n}(X - E[X])(Y - E[Y])}{\sqrt{E[(X - E[X])^2]}\sqrt{E[(Y - E[Y])^2]}} =$$

$$\frac{\sum_{i=1}^{n}(X - \overline{X})(Y - \overline{Y})^T}{\sqrt{\overline{X^2} - \overline{X}^2}\sqrt{\overline{Y^2} - \overline{Y}^2}} = \frac{(X - \overline{X}) \cdot (Y - \overline{Y})}{\|X - \overline{X}\|\|Y - \overline{Y}\|},$$

(X, Y is vector)

Correlation Distance $(X,Y)=1-\text{Corr}(X,Y), 0 \leq \text{Correlation Distance} \leq 2$, real number) [Equation 2]

Figure 9:
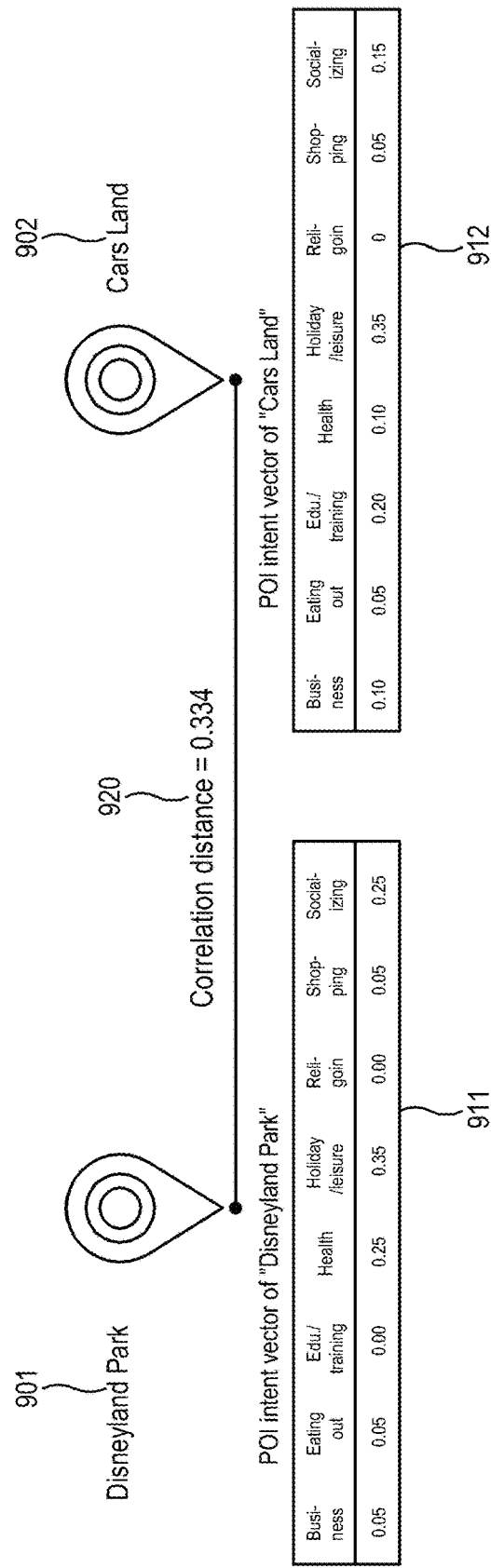
FIG. 9 is a diagram illustrating an example of a correlation distance between two nodes of travel destinations.

FIG. 9 is a diagram illustrating an example of a correlation distance between two nodes of travel destinations.

Referring to FIG. 9 and the Equations 1 and 2, For example, a correlation distance 920 between the Disneyland Park 901 and the Cars Land 902 is determined using the POI intent vectors 911 and 912 of the respective nodes (Disneyland Park and Cars Land). Since the determined distance is 0.334 smaller than 0.8, the corresponding nodes are linked in the travel-destination network.

The attraction relationship extractor 362 determines the correlation distance having a real number value ranging from 0 to 2 as an effective edge.

Accordingly, the determined POI nodes, the corresponding travel-destination intent vector, and the edge information are stored as the travel-destination network in the database 363.

Figure 10:
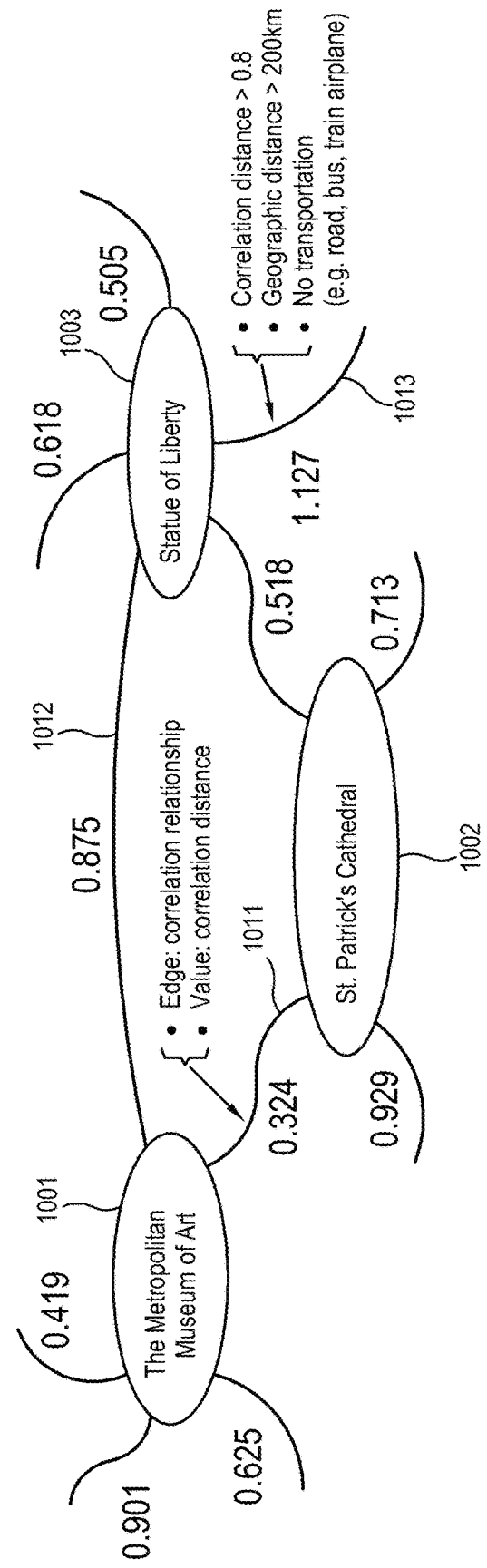
FIG. 10 is a diagram illustrating an example of edge information corresponding to the correlation distance and the travel-destination intent vectors determined with respect to a plurality of nodes.

FIG. 10 is a diagram illustrating an example of edge information corresponding to the correlation distance and the travel-destination intent vectors determined with respect to a plurality of nodes.

Referring to FIG. 10, there is an edge distance of 0.324 between the Metropolitan Museum of Art 1001 and the St. Patrick's Cathedral 1002, which are given as the nodes. Therefore, the edge 911 between the two nodes 1001 and 1002 is effective.

On the other hand, there is an edge distance of 0.875 between the Metropolitan Museum of Art 1001 and the Statue of Liberty 1003. Since the edge distance of 0.875 is greater than 0.8, the edge 1012 between the two nodes 1001 and 1003 is not effective. Likewise, although it is not illustrated, an edge 1013 between the Statue of Liberty 1003 and a predetermined node is not effective.

Here, the nodes linked by the effective edge may be utilized as a next-destination recommendation object to be described later.

Referring back to FIG. 6, travel destination meta information received from a POI information provider 612 may be used in construction 605 of the travel-destination network. To this end, there is need of extracting the POI nodes and matching the corresponding meta information 613 to the extracted POI nodes.

As illustrated in FIG. 7, the attraction network constructor 370 includes an attraction node extractor 371 for extracting the POI nodes to be used as the nodes of the travel-destination network, an attraction meta-data interpreter 372 for extracting meta information (e.g. locations, types, ratings, etc.) about the travel destinations in the travel-destination network and matching the meta information to the respective travel destinations, an attraction graph drawing unit 373 for drawing the POI nodes of the travel-destination network based on a geographical correlation, and an attraction node database 374 for storing information about the nodes in the travel-destination network.

The attraction meta-data interpreter 372 matches the nods extracted by the attraction node extractor 371 to the received meta information. Accordingly, the information about each node involves the meta information. For example, information about a predetermined node (e.g. the Disneyland Park) is as follows.

name: Disneyland Park
_id: 5108564e-f7b9-4881-a7e1-e1ca162e8df0
type: Amusement|Theme Parks, Disney
address: {Anaheim, Calif., USA, 92803-3232, 1313 S Harbor Blvd}
geo_location: {33.815331, -117.91922}
number_of_reviews: 8790
overall_rating: 9.0
Intent_vector: {0.10, 0.11, 0.14, 0.15, 0.13, 0.08, 0.12, 0.17}

Figure 11:
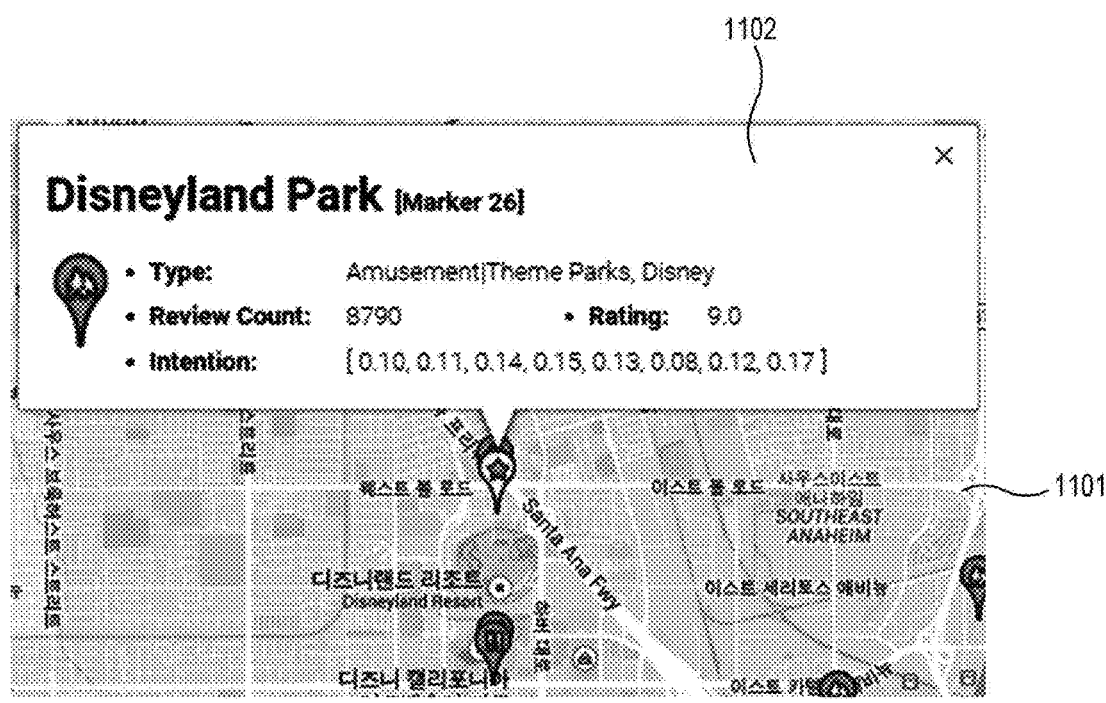
FIG. 11 is a diagram illustrating an example of drawing a part of the travel-destination network including predetermined nodes according to an example embodiment.

The attraction graph drawing unit 373 renders the POI nodes reflecting a geographical correlation based on the foregoing node information FIG. 11 is a diagram illustrating an example of drawing a part of the travel-destination network including predetermined nodes according to an example embodiment.

As illustrated in FIG. 11, a travel-destination network screen 1101 including a predetermined node (e.g. Disneyland Park) may be displayed based on rendering of the attraction graph drawing unit 373, and information about the node selected by a user may be displayed in an information window 1102.

In this embodiment, the screen 1101 of FIG. 11 may be provided to a user through the display 190 of the terminal 100 accessing the system of providing the travel-destination recommendation service.

According to this example embodiment, as illustrated in FIG. 6, the travel-destination network is constructed based on the travel-destination intent vector and the travel destination meta information (605), and the travel-destination network is stored in the server 200 as the database 210 of storing information for providing the travel-destination recommendation service (606).

With this, it is possible to suggest the next destination.

Below, there will be described a process of recommending a user the next travel destination (or event) based on the travel-destination network stored in the database 210 of the server 200 in response to a user's input data received through the terminal 100.

According to an example embodiment, the system of providing the travel-destination recommendation service includes an event suggestion unit 380 for recommending a user the next travel destination as illustrated in FIG. 12.

Referring to FIG. 12, the event suggestion unit 380 in this embodiment includes a visit intent interpreter 381 for generating a user preference vector based on a user's intent with respect to a user's input data (e.g. a new review), a context profile translator 382 and a next-destination predictor 383 for collecting user profile information and context information and finding a rule on ontology, and a database 384 for storing next-destination prediction rules.

In this embodiment, the next-destination prediction rules stored in the database 384 may correspond to scenarios 1 to 3 to be used in recommending the next destination. The next destination predictor 383 may determine a user's next travel destination by applying the user preference vector created in the visit intent interpreter 381 to one of the scenarios stored in the database 384 where the next-destination prediction rules are stored. Here, the user preference vector may be varied depending on the information collected by the context profile translator 382.

According to an example embodiment, as illustrated in FIG. 6, the next travel destination is suggested for a user based on the network constructed by analyzing the visit intent according to the travel destinations (607). Here, the suggestion on the next destination may be achieved by referring to a user environment 621, context information 622, a review 624 input by a user 623, a user model 625, etc. The recommended next destination may be delivered to a user through the terminal 100 (626).

Such a suggestion on the next destination may be carried out according to one among a plurality of scenarios to be described below.

Figure 13:
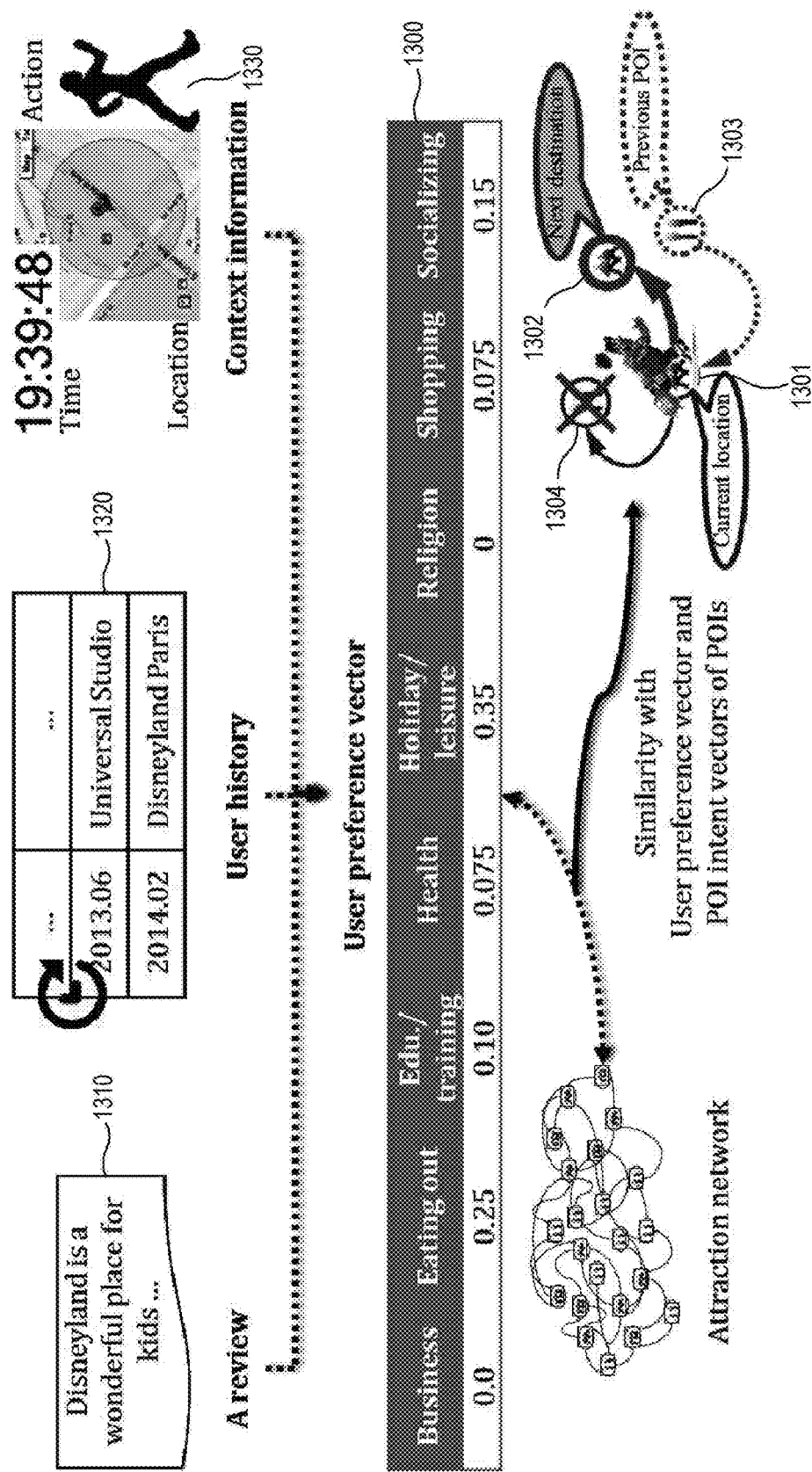
FIG. 13 is a view of schematically describing a plurality of scenarios for suggesting the next destination according to an example embodiment.

FIG. 13 and Table 4 schematically describe a plurality of scenarios for suggesting the next destination according to an example embodiment.

TABLE 4

| Sort | scenario 1<br>Review-based<br>prediction | scenario 2<br>User history-based<br>prediction | scenario 3<br>Context-based<br>prediction |
|---|---|---|---|
| Trigger event | Writing review by user | Update of travel history | Update of context information |
| Reference for prediction | Similarity between written review and POI intent vector of other POIs | Similarity between a user preference vector and POI intent vector of other POIs | Rules based on user preference vector |
| Data needed for analysis | User's review of visit POI + other users' review of visit POIs | User model (travel history) + other users' review of visit POIs | Contextual data + user preference vector |

As illustrated in FIG. 13, the scenarios 1 to 3 shown in Table 4 involve a common process.

Specifically, a user preference vector 1300 is created in response to a trigger event corresponding to one among a review 1310, a user history 1320 and context information 1330, and the next destination 1302 at the current location 1301 is recommended based on similarity between the user preference vector and the POIN intent vectors of the POIs.

Accordingly, the event suggestion unit 380 of FIG. 12 suggests the next destination 1302 among the plurality of travel destinations 1302, 1303 and 1304 based on the similarity with the current travel destination 1301.

Figure 15:
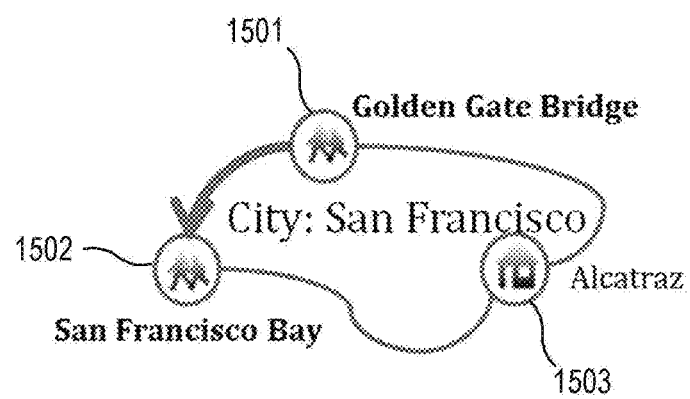
Figure 16:
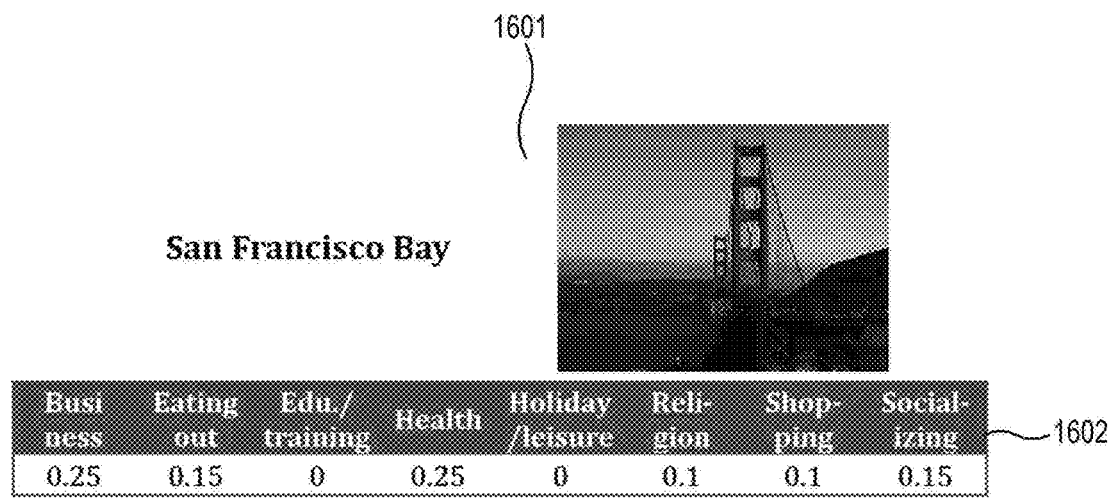

FIG. 14 to FIG. 16 are diagrams illustrating an example of suggesting the next destination based on a user's review.

The embodiment illustrated in FIG. 14 to FIG. 16 corresponds to the scenario 1 of Table 4, and the processes thereof are as follows.

<Scenario 1>

If a user writes a new review of a visit travel destination, the travel destinations are primarily filtered based on information (e.g. location, mentioned POIs, etc.) acquired from the corresponding review, and the next travel destination is suggested based on similarity with the visit intent using the travel-destination network in the database 210 of the server 200. Here, the primary filtering for the travel destinations may for example include an operation of excluding the other travel destinations from the objects except the travel destinations located within a predetermined distance (or moving time) from the travel destination (POI) corresponding to a user's review.

Referring to FIG. 14, according to this embodiment, a user visits a predetermined travel destination, for example, Golden Gate Bridge 1401, and writes a user's review 1402 on a predetermined travel website (e.g. TripAdvisor). Here, a user may use the terminal 100 to write the corresponding review. Further, the review object, e.g. the Golden Gate Bridge 1401 is the visited travel destination (e.g. the visited POI).

In this embodiment, a user's review written using the terminal 100 is sent to the server 200 for the event-recommendation service, and the server 200 transmits a recommended object, e.g. information about the next destination to the terminal 100, thereby offering the recommended object to a user. Here, a user's review is transformed into a user preference vector (to be described later) in the terminal 100, and then sent to the server 200. Alternatively, the review data may be sent to the server 200 and then transformed into the user preference vector in the server 200.

The visit intent evaluator 351 of FIG. 3 transforms the written review 1402 into the user preference vector according to the intent classification, and learns the visit intent (e.g. a user's intent) from the corresponding review. For the transformation into the user preference vector, an algorithm based on the word embedding illustrated in FIG. 4 may be used for creating the visit intent vector.

Accordingly, the user preference vector for the travel destination, e.g. the Golden Gate Bridge may be for example created as shown in the following Table 5.

TABLE 5

| business | eating out | Education and training | health | holidays/leisure | religion | shopping | socializing |
|---|---|---|---|---|---|---|---|
| 0.15 | 0.2 | 0 | 0.3 | 0 | 0.1 | 0.1 | 0.15 |

The user preference vectors created as shown in Table 5 are labeled by the document intention tagger 352 as an annotation to a user's views of FIG. 14, and embedded in the database 353.

In addition, as illustrated in FIG. 15, the San Francisco Bay 1502 having the POI intent vector similar to the user preference vector of the Golden Gate Bridge 1501 may be recommended as the next destination among the POI intent vectors of the POIs 1502, 1503 involved in the travel-destination network of the server 200.

FIG. 16 illustrates a POI intent vector 1602 tagged to the corresponding POI of the travel-destination network with respect to the San Francisco Bay 1601, e.g. the recommended object in the scenario 1, in which a value of the health is relatively high as compared with values of other items like the user preference vector of Table 5.

The terminal 100 receives data about the next destination from the server 200 and provides the data to a user through the display 190 as illustrated in FIG. 16.

In connection with the scenario 1, a user may alternatively input a user's review through an SMS, an SNS application, E-mail, etc. without directly registering the review to the corresponding travel-related website. Further, the review received through the terminal 100 includes not only a text but also a voice input. Here, an application of recognizing a user's input review as a trigger event is installed in the terminal 100, and monitors whether a user's review is input or not.

Figure 17:
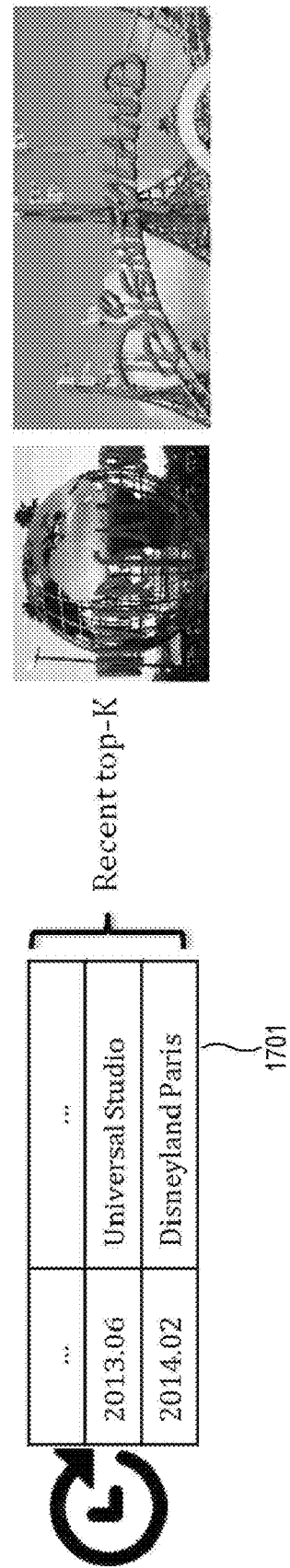
FIG. 17 to FIG. 19 are diagrams illustrating an example of suggesting the next destination based on a user's history.
Figure 18:
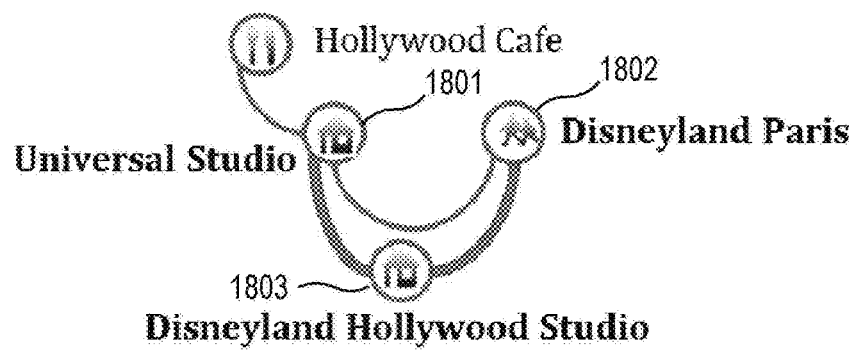
Figure 19:
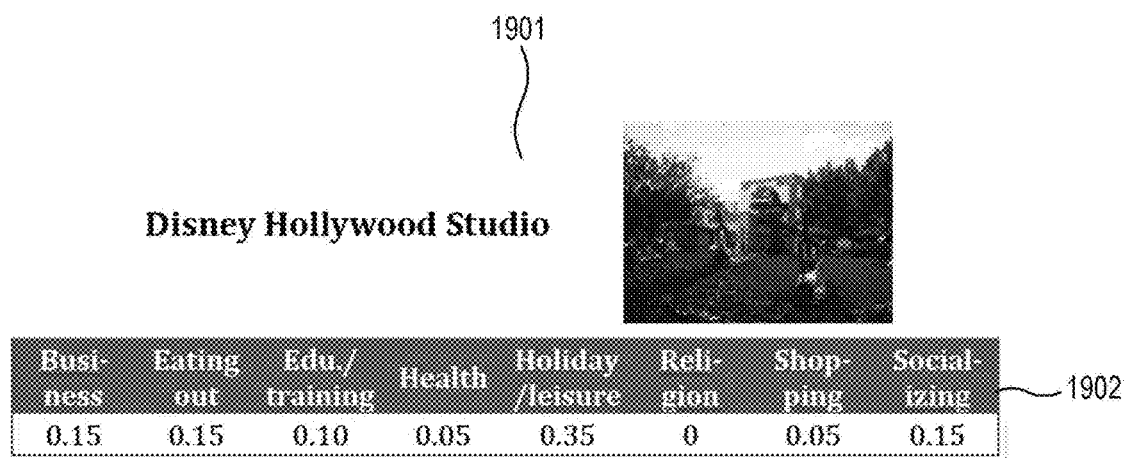

FIG. 17 to FIG. 19 are diagrams illustrating an example of suggesting the next destination based on a user's history.

The embodiment illustrated in FIG. 17 to FIG. 19 corresponds to the scenario 2 of Table 4, and the processes thereof are as follows.

<Scenario 2>

The next travel destination is suggested by analyzing a user's long-term travel-preference information from the past record about a user's travel.

Referring to FIG. 17, in this embodiment, there may be reviews 1701 written by a user with respect to a plurality of visited travel destinations, for example, Universal Studio, Disneyland Paris, etc. These reviews 1701 may be input at a predetermined distance of time.

In this embodiment, the server 200 may sense the update of a user's travel-related history as the trigger event. Here, the history may be variously updated for example when a user subscribes to an event suggesting service through the terminal 100.

The visit intent evaluator 351 of FIG. 3 creates the visit intent vector according to the intent classification with respect to each of the plurality of updated reviews 1701, and averages/normalizes the visit intent vector to compute a user preference vector, thereby learning the visit intent (e.g. a user's intent). Here, the algorithm for creating the visit intent vector based on the word embedding illustrated in FIG. 4 is used to create the visit intent vector, and the algorithm for computing the POI intent vector illustrated in FIG. 8 may be used to compute a user preference vector using the plurality of visit intent vector.

The following Tables 6 and 7 show Examples of the visit intent vectors created with respect to Universal Studio and Disneyland Paris.

TABLE 6

| business | eating out | Education and training | health | holidays/ leisure | religion | shopping | social-izing |
|---|---|---|---|---|---|---|---|
| 0.10 | 0.10 | 0.05 | 0.05 | 0.35 | 0 | 0.10 | 0.25 |

TABLE 7

| business | eating out | Education and training | health | holidays/ leisure | religion | shopping | social-izing |
|---|---|---|---|---|---|---|---|
| 0.15 | 0.15 | 0.05 | 0.10 | 0.35 | 0 | 0.05 | 0.05 |

Accordingly, the user preference vectors reflecting the user history may be for example created as shown in the following Table 8.

TABLE 8

| business | eating out | Education and training | health | holidays/ leisure | religion | shopping | social-izing |
|---|---|---|---|---|---|---|---|
| 0.125 | 0.125 | 0.01 | 0.075 | 0.35 | 0 | 0.075 | 0.15 |

The user preference vectors created as shown in Table are labeled by the document intention tagger 352 as annotation to the respective reviews 1701 of FIG. 17, and embedded in the database 353.

In addition, as illustrated in FIG. 18, the Disney Hollywood Studio 1803 having the POI intent vector similar to the user preference vectors of Table 8 may be recommended as the next travel destination following the Universal Studio 1801 and Disneyland Paris 1802.

FIG. 19 illustrates a POI intent vector 1902 of Disney Hollywood Studio 1901, e.g. the recommended object in the scenario 2, in which a value of the holidays/leisure is relatively high as compared with values of other items like the user preference vector of Table 8.

The terminal 100 receives data about the next destination from the server 200 and provides the data to a user through the display 190 as illustrated in FIG. 19.

In connection with the scenario 2, a user's past reviews of the visited travel destinations may be variously input trough an SMS, an SNS application, etc. Further, the review received through the terminal 100 includes not only a text but also a voice input. Here, the terminal 100 combines the reviews received in various methods and recognizes the reviews as a user's past history, and this may be for example to recognize the history update as the trigger event in response to installation or the like of an application of providing the event-recommendation service.

Further, in FIG. 17 to FIG. 19, two previously visited travel destinations are used as the past history to create the user preference vector, but not limited thereto. That is, the more a user's reviews of the visited destinations, the better the reflection of a user's preference. To this end, three or more travel destinations may be used in creating the user preference vector according to an example embodiment.

FIG. 20 to FIG. 24 are diagrams illustrating an example of suggesting the next destination based on a user's context awareness.

The embodiment illustrated in FIG. 20 to FIG. 24 corresponds to the scenario 3 of Table 4, and the processes thereof are as follows.

<Scenario 3>

A user's interest is varied depending on a user's context information (e.g. location, time, weather, actions or the like to be hereinafter referred to as content information), and the travel-destination network is used according to the varied interest of a user, thereby suggesting the next travel destination.

Referring to FIG. 20, according to this embodiment, if a user's context information is updated, a user preference vector 2001 is varied to reflect the updated context. For example, a user may want information about places for lunch at twelve noon as illustrated in FIG. 20. Thus, the user preference vector created in the scenario 1 or the scenario 2 may increase with regard to an item of "eating out".

Referring to FIG. 20, the user preference vector 2002 increases up to 0.4 with regard to the item of "eating out". In addition, the values of the other items except "eating out" may decrease in proportion to their percentages of all the items.

In this embodiment, a condition of updating the context information may be previously designated and stored. For example, a condition of "if {Time: {Apr. 13, 2015 12:00:00 PM} then {setValue("Eating out", MAX_INTENT), . . . }" is previously set, and the terminal 100 senses a context satisfying this condition as a trigger event In this embodiment, if the terminal 100 senses a state of satisfying a condition of context information, the controller 110 may inform the server 200 of this through the communicator 120, 130. Here, the user preference vector may be changed in the terminal 100 and then transmitted to the server 200. Alternatively, only the context information is transmitted to the server 200 and then the user preference vector may be changed in the server 200. In addition, information about the next destination, e.g. the recommended object corresponding to the context information changed in the server 200 is transmitted to the terminal 100, and provided to a user.

Accordingly, as illustrated in FIG. 21, a restaurant of "MIZU Sushi Bar & Grill" 2101 in San Jose, which is close to a user's current location and has high similarity with the changed user preference vector, may be recommended as the next destination. That is, not only the condition of time, e.g. twelve noon, but also a user's current location is used as the context information, and the information about a user's current information is sensed in the terminal 100 and sent to the server 200.

In this embodiment, if the terminal 100 senses an action of "staying" as the context information that a user stays at a certain place for a long time (e.g. more than an hour), the user preference vector changed in FIG. 20 may be changed again.

Figure 22:
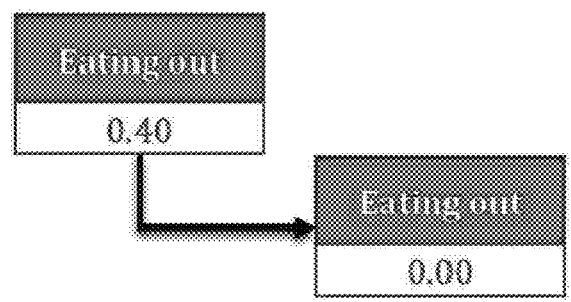

For example, it may be interpreted as eating that a user stays at a certain place for a long time, and thus a value of "eating out" decreases from 0.40 to 0.00 as illustrated in FIG. 22.

After lunch, if a user's walking action is sensed, Winchester Mystery House, of which "eating out" has the lowest value, may be recommended as the next destination among the surrounding travel destinations (e.g. POIs) the next destination.

Figure 23:
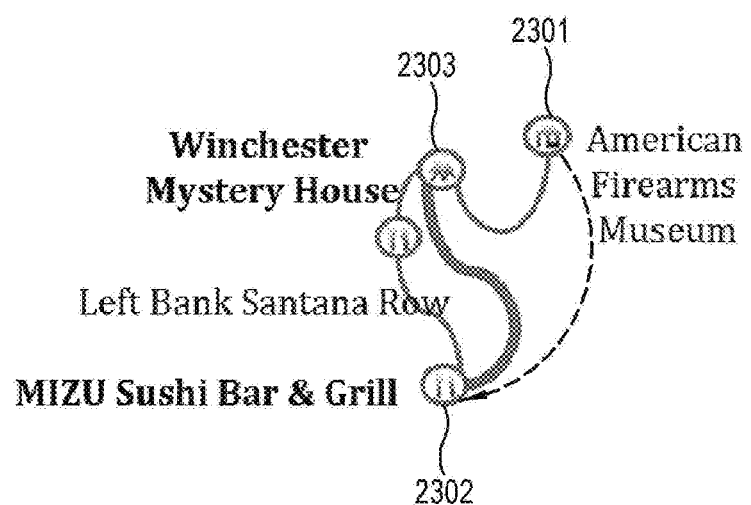

In case of the scenario 3 referring to FIG. 23, a user visits the "American Firearms Museum" 2301 in San Jose and inputs a corresponding review, a user preference vector is created corresponding to the review. Here, if the content information is updated as the current time comes closer to twelve noon, the created user preference vector is changed.

In other words, as illustrated in FIG. 20, the user preference vector is changed to increase the value of "eating out", and thus a surrounding restaurant of "MIZU Sushi Bar & Grill" 2302 may be recommended as the next destination.

Then, if the content information is updated as a user stays at the recommended place 2302 for a long time, the user preference vector is changed to decrease the value of "eating out" as illustrated in FIG. 22.

Figure 24:
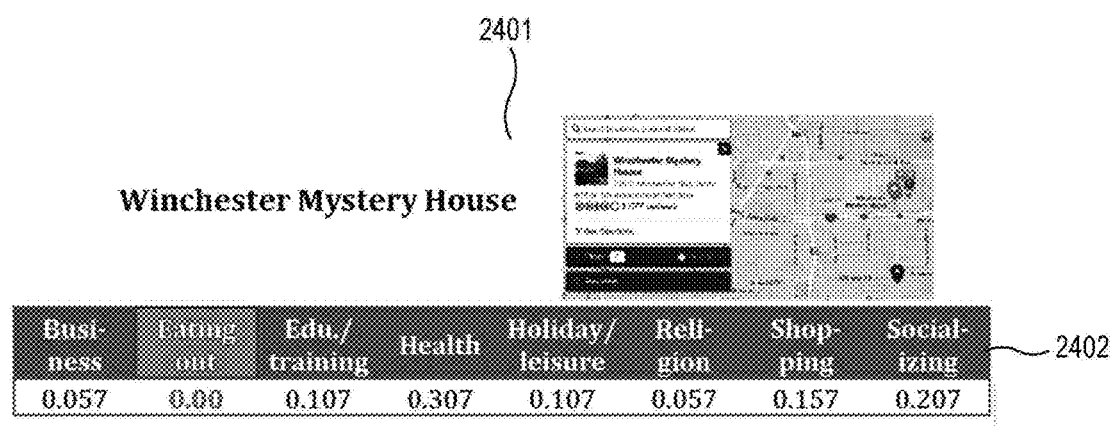

Then, the "Winchester Mystery House" 2303, which has the similarity with the previously visited "American Firearms Museum" 2301, is recommended as the next destination Accordingly, a user's terminal 100 may display brief information about the Winchester Mystery House 2401 as a recommended event through the display 190 as illustrated in FIG. 24. As necessary, a POI intent vector 2402 may be displayed together with the brief information 2401.

If the context information is not updated in the state that a user visits "American Firearms Museum" 2301 as described above with reference to FIG. 23 (e.g. at 3 p.m. of the visit time), the user preference vector is not changed and therefore the "Winchester Mystery House" 2303 may be directly recommended as the next destination in accordance with the foregoing scenario 1.

Below, a method of suggesting an event through the terminal 100 and the server 200 according to an example embodiment will be described with reference to FIG. 25.

Figure 25:
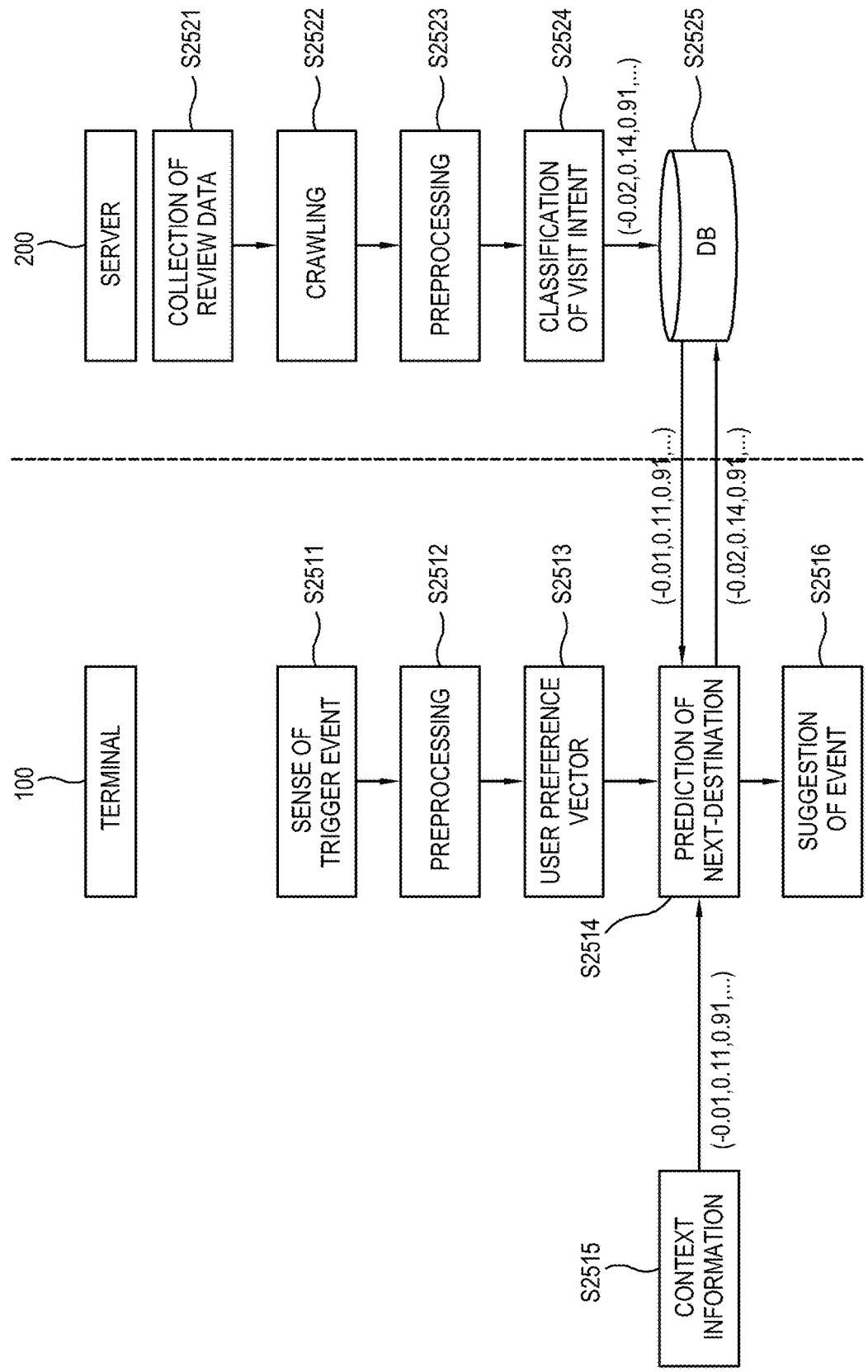
FIG. 25 is a flowchart illustrating an example event recommendation method according to an example embodiment.

FIG. 25 is a flowchart illustrating an example event recommendation method according to an example embodiment.

As illustrated in FIG. 25, the server 200 collects review data about a plurality of travel destinations from travel-related websites (S2521).

The review data collected in the operation S2521 is crawled (S2522) and preprocessed (S2523) to create a visit intent vector reflecting a user's intent classification, e.g. visit intent classification of travel destinations (S2524). As described with reference to FIG. 4, the review vector and the intent vector are used to create one visit intent vector with respect to one user review, and the operation S2524 includes creating a POI visit intent vector with regard to the travel destination (or a place of interest, POI), e.g. a specific object by averaging/normalizing the visit intent vectors with regard to a specific travel destination as illustrated in FIG. 8.

In addition, the POI visit intent vector created in the operation S2524 is stored as a travel-destination network in the database 210 of the server 200 (S2525).

By the way, the terminal 100 may sense a trigger event with respect to a predetermined object (e.g. the travel or attraction destination) (S2511). Here, the trigger event includes the trigger event in the scenarios described with reference to FIG. 13, which for example includes a user's input data such as a text or voice about a predetermined travel destination.

The terminal 100 preprocesses data corresponding to the trigger event sensed in the operation S2511 (S2512). Here, the preprocessing including the language filtering process and the unnecessary data (words) removal performed in the preprocessor 320 of FIG. 3. As necessary, the primary filtering in the foregoing scenario 1 may be included in the preprocessing.

Then, a user preference vector is created corresponding to the trigger event sensed in the operation S2511 (S2513). Here, the user preference vector may be created in accordance with one of the scenarios 1 to 3 illustrated in FIG. 13.

In addition, the terminal 100 predicts a user's next destination based on similarity between the user preference vector created in the operation S2511 and the POI intent vectors included in the travel-destination network of the database 210 stored in the operation S2525 (S2514).

Here, the terminal 100 may sense a user's context information (S2515), and the context information may be used in predicting the next destination in the operation S2514. This corresponds to the scenario 3 of FIG. 13.

The next destination predicted in the operation 2514 is suggested to a user for the next event by the terminal 100 (S2516).

FIG. 25 illustrates by way of example that the operations S2512, S2513 and 52015 are carried out in the terminal 100. As necessary, the server 200 may be notified that an event occurs, and predict the next destination based on similarity with a user's intent, thereby informing the terminal 100 of the next destination. Further, the information of the database 210 built up in the operation S2525 may also be stored in the terminal 100, so that the terminal 100 can load the information and predict the next destination based on similarity with a user's intent.

According to an example embodiment, the travel-destination network reflecting various reviews according to the objects (e.g. the travel destinations) is established in the database, and the next event is suggested to a user based on similarity with the objects in the database when an event occurs corresponding to a user's intent or context.

Accordingly, the event corresponding to preference (a user's intent) is properly suggested to even a user who has a restricted experience, thereby providing the event-recommendation service to make a user's satisfaction higher.

Further, the travel-destination network is established based on many pieces of review data collected from various users, and thus universal user intent/preference is used in suggestion, thereby improving accuracy in data classification and event recommendation.

Further, not only the reviews directly written by a user but also a user's past history and context information are used in recommending an event, thereby providing a service to meet demands of various users.

By the way, the foregoing example embodiments may be realized in a computer-readable recording medium. The computer-readable recording medium includes a transfer medium and a storage medium for storing data readable by a computer system. The transfer medium may be realized by a wired/wireless network to which the computer system is connected.

The foregoing example embodiments may be realized by hardware and combination between hardware and software. As the hardware, the terminal 100 and/or the server 200 may include a nonvolatile memory in which the software, e.g. a computer program is stored, a RAM to which the computer program stored in the nonvolatile memory is loaded, and at least one processor, e.g. a CPU for executing the computer program loaded to the RAM. The nonvolatile memory includes a hard disk drive, a flash memory, a ROM, CD-ROMs, magnetic tapes, a floppy disc, an optical storage, a data transfer apparatus using Internet, etc., but not limited thereto. The nonvolatile memory is a kind of computer-readable recording medium in which a program readable by a computer is recorded.

The computer program is a code that is read and executed by the CPU, and includes codes for performing the operations S2511 to S2516 or the operations S2521 to S2525 as illustrated in FIG. 25.

The computer program may be included in an operating system provided in the terminal 100 or software including an application and/or software interfacing with an external apparatus.

Although a few example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A place recommendation method, the method comprising:
   identifying a first visit intent vector of a first user for a first place, the first visit intent vector being assigned with values for a plurality of reference items based on a visit intent of the first user and the plurality of reference items corresponding to a plurality of visit intentions, respectively;
   identifying a second visit intent vector of a second user for a plurality of second places, the second visit intent vector being assigned with values for the plurality of reference items based on a visit intent of the second user;
   identifying a second place which follows the first place among the plurality of second places based on a similarity between the identified first visit intent vector and the identified second visit intent vector; and
   performing an operation on the identified second place.

2. The method according to claim 1, wherein the identifying the first visit intent vector further comprises identifying the first visit intent vector based on user input data received through a terminal.

3. The method according to claim 2, wherein the user input data comprises at least one of: a text, a picture, a moving picture and a voice uttered by the first user, and the user input data is input by at least one of: a review input to a website, a short message service (SMS), a social network service (SNS) and E-mail.

4. The method according to claim 2, wherein the user input data comprises a plurality of user reviews input at a predetermined time difference and corresponding to a plurality of first places, respectively,
   the method further comprises updating history information including the plurality of user reviews.

5. The method according to claim 1, further comprising:
   receiving a user's context information;
   changing the first visit intent vector by increasing or decreasing a value of at least one among the plurality of reference items in the first visit intent vector based on the received user's context information.

6. The method according to claim 1, wherein the first place comprises a travel destination previously visited by the first user, and the second place comprises a next travel destination recommendable based on the visit intent of the first user about the visited travel destination.

7. The method according to claim 6, further comprising collecting review data of the plurality of second places from at least one accessible website.

8. The method according to claim 7, wherein the collecting the review data comprises:
   creating the second visit intent vector based on the visit intent of the second user with respect to the collected review data; and
   adding a travel-destination visit intent vector, which is created by averaging and normalizing the created second visit intent vector based on the plurality of second places, as the second visit intent vector to the plurality of second places.

9. The method according to claim 8, wherein the creating the second visit intent vector comprises:
   crawling the collected review data;
   preprocessing at least one word to be filtered out of the crawled review data; and
   transforming the preprocessed review data into a review vector by word embedding.

10. The method according to claim 9, further comprising:
    creating intent vectors respectively corresponding to the plurality of reference items from a set of words based on intents respectively created with respect to the plurality of second places; and
    identifying a similarity between the transformed review vector and each of the plural intent vectors corresponding to the plurality of reference items and assigning the similarity to the second visit intent vector.

11. The method according to claim 10, wherein the collecting the review data comprises:
    identifying a correlation distance between the plurality of second places by the travel-destination visit intent vector; and
    establishing a travel-destination network model so that the plurality of second places can be linked to form a network if the correlation distance is not greater than a predetermined reference value.

12. A terminal comprising:
    a display; and
    at least one processor configured to:
       identify a first visit intent vector of a first user for a first place, the first visit intent vector being assigned with values for a plurality of reference items based on a visit intent of the first user and the plurality of reference items corresponding to a plurality of visit intentions, respectively, control the display to display information for a second place which follows the first place among a plurality of second places, the second place being identified based on a similarity between the identified first visit intent vector and a second visit intent vector of a second user for the plurality of second places, and the second visit intent vector being assigned with values for the plurality of reference items based on a visit intent of the second user.

13. The terminal according to claim 12, further comprises input circuitry configured to receive a user's input, wherein the at least one processor is configured to identify the first visit intent vector based on user input data received through the input circuitry.

14. The terminal according to claim 13, wherein the user input data comprises a plurality of user reviews input at a predetermined time difference and respectively corresponding to a plurality of first places, and the at least one processor configured to update history information comprising the plurality of user reviews.

15. The terminal according to claim 13, wherein the at least one processor is configured to:

receive a user's context information, and change the first visit intent vector by increasing or decreasing a value of at least one among the plurality of reference items in the first visit intent vector based on the received user's context information.

16. A server comprising:

communication circuitry configured to communicate with a terminal which identifies a first visit intent vector of a first user for a first place, the first visit intent vector being assigned with values for a plurality of reference items based on a visit intent of the first user and the plurality of reference items corresponding to a plurality of visit intentions, respectively; and at least one processor configured to:

identify a second visit intent vector of a second user for a plurality of second places, the second visit intent vector being assigned with values for the plurality of reference items based on a visit intent of the second user, identify a second place which follows the first place among the plurality of second places based on a similarity between the identified first visit intent vector and the identified second visit intent vector, and control the communication circuitry to send information about the second place to the terminal so that the terminal performs an operation on the identified second place.

17. The server according to claim 16, wherein the first place comprises a travel destination previously visited by the first user, and the second place comprises a next travel destination recommendable based on the visit intent of the first user about the visited travel destination.

18. The server according to claim 17, wherein the at least one processor is configured to:

collect review data of the plurality of second places from at least one accessible website, create the second visit intent vector based on the visit intent of the second user with respect to the collected review data, and add a travel-destination visit intent vector, which is created by averaging and normalizing the created second visit intent vector based on the plurality of second places, as the second visit intent vector to the plurality of second places.

19. The server according to claim 18, wherein the at least one processor is configured to:

determine a correlation distance between the plurality of second places by the travel-destination visit intent vector, and establish a travel-destination network model so that the plurality of second places can be linked to form a network if the correlation distance is not greater than a predetermined reference value.

* * * * *